(12) United States Patent
Mohr

(10) Patent No.: US 10,023,502 B1
(45) Date of Patent: Jul. 17, 2018

(54) ACIDIFYING COMPOUND

(71) Applicant: Larry D. Mohr, Tempe, AZ (US)

(72) Inventor: Larry D. Mohr, Tempe, AZ (US)

(*) Notice: Subject to any disclaimer, the term of this patent is extended or adjusted under 35 U.S.C. 154(b) by 128 days.

(21) Appl. No.: 15/140,595

(22) Filed: Apr. 28, 2016

Related U.S. Application Data

(60) Provisional application No. 62/155,414, filed on Apr. 30, 2015.

(51) Int. Cl.
*C05F 11/00* (2006.01)
*C09K 17/14* (2006.01)

(52) U.S. Cl.
CPC ............ *C05F 11/00* (2013.01); *C09K 17/14* (2013.01)

(58) Field of Classification Search
CPC .................................. C05F 11/00; C09K 17/14
See application file for complete search history.

(56) References Cited

U.S. PATENT DOCUMENTS

| | | | |
|---|---|---|---|
| 5,298,482 A | 3/1994 | Tanaka | |
| 6,383,245 B1* | 5/2002 | Yamashita | C05D 3/00 71/11 |
| 7,344,730 B1 | 3/2008 | Stadler | |
| 2006/0084573 A1* | 4/2006 | Grech | C05B 7/00 504/101 |
| 2009/0305888 A1* | 12/2009 | Li | C05D 9/00 504/101 |
| 2011/0130291 A1* | 6/2011 | Birthisel | A01N 25/12 504/361 |
| 2013/0145805 A1* | 6/2013 | Olson | C05D 9/00 71/6 |

FOREIGN PATENT DOCUMENTS

| | | |
|---|---|---|
| CN | 104876727 A | 9/2015 |
| CN | 104892307 A | 9/2015 |
| WO | 2016035090 A1 | 3/2016 |

OTHER PUBLICATIONS

Agrichem. "Agri-PKS" <http://www.agrichem.com.au/products/pis/Agri-PKS%20-%20PIS_AUS.pdf> Jan. 25, 2014 pp. 1-3.*

* cited by examiner

*Primary Examiner* — Jennifer A Smith
(74) *Attorney, Agent, or Firm* — Schmeiser, Olsen & Watts LLP

(57) ABSTRACT

The disclosed invention relates to soil and water treatment compounds, specifically to an acidifying composition used to treat soil or irrigation water used for growing plants. Disclosed is an acidifying composition that includes an organic acid. The acidifying composition is used to control and manage conditions in irrigation water and soil to prevent sodic deterioration of soil structure. Treatment of soil and/or irrigation water with the disclosed acidifying composition leads to improved soil quality and improved quality of plants grown in the soil treated with the acidifying composition.

11 Claims, 6 Drawing Sheets

ACIDIFYING COMPOUND

The present disclosure relates to soil and water treatment compositions, and specifically to a composition used to treat soil and/or irrigation water used for growing plants.

Irrigation water containing excessive levels of sodium, carbonate, and bicarbonate ions can pose major problems for farmers, ranchers, turf-grass managers, and crop managers. Calcium plays a key role in soil structure. Calcium and other polyvalent cations such as magnesium, are strongly attracted to negative sites on soil surfaces, where they form ion bridges that hold soil particles together, restrict swelling, and prevent dispersion. Thus, calcium, magnesium, and similar polyvalent cations are a contributor to positive soil quality. However, carbonates and other anions in water have a high affinity for calcium and magnesium. This chemical attraction can result in the formation of insoluble salts and prevents calcium from being available to the soil and the plants. The buildup of insoluble salts in water and soil contributes to decreased soil aeration, soil percolation, and soil drainage; and negatively affects crops grown in the soil. In addition to overall poor soil quality, the accumulation of monovalent cations (e.g., sodium) in soil can impart toxicity to plants, nutrient deficiencies, and relatively high pH (e.g., pH≥8).

Known techniques and practices for removing salts and/or alkalis are often expensive and relatively ineffective. One such technique is amending the soil by incorporation of cattle manure and/or green manures into the topsoil to maintain a porous condition that will induce infiltration of water into the soil. In high temperature climates, typical of irrigated arid regions, these organic amendments decay rapidly and their influence on soil properties is lost. Another technique involves the application of gypsum, sulfuric acid, or elemental sulfur to facilitate the removal of sodium. This technique requires large quantities of materials (typically on the order of tons/acre), considerable manpower and fuel, and is only temporarily effective. Yet another technique previously employed is the mechanical practice of chiseling, deep plowing, and slip plowing to improve water movement into and through the soil profile. This practice is of a relatively short-term benefit because the soils tend to slake down and close up after being irrigated requiring reworking on a yearly basis.

Accordingly, among the various aspects of the present disclosure, therefore, is a composition that can reduce salt buildup in soil, improve soil aeration, percolation, and drainage, and/or liberate polyvalent cations, such as calcium and magnesium, from precipitates thereby increasing the accessibility of the polyvalent cations to the soil.

Disclosed is an acidifying composition comprising an organic acid. The acidifying composition may be used to control and manage conditions in irrigation water and soil to prevent and treat sodic deterioration of soil structure. Treatment of soil and/or irrigation water leads to improved growth and quality of plants grown in the soil treated with the acidifying composition. In some embodiments, the acidifying composition includes a coordinating agent. In some embodiments, the coordinating agent is a chelator. The acidifying composition can be a liquid or a solid. In some embodiments, the acidifying composition is mixed with water to form a solution. In some embodiments, the acidifying composition includes gypsum or lime. In some embodiments, the acidifying composition is mixed with gypsum or lime.

Also disclosed is a method of promoting plant growth, conditioning soil, fertilizing plants, or conditioning irrigation water, where the method comprises mixing an acidifying composition with water, and applying the mixture of acidifying composition and water to soil, wherein at least one plant is planted in the soil. In some embodiments, the method includes adding a source of calcium to the soil.

Further disclosed is a method of conditioning soil used to grow plants, promoting plant growth, or fertilizing plants, where the method comprises applying an acidifying composition to soil, where the soil is used to grow plants; and applying water to the soil. In some embodiments, the method includes adding a source of calcium to the soil.

Briefly, therefore one aspect of the present disclosure is an acidifying composition for water and/or soil treatment wherein the acidifying composition comprising an acid, a base, and an amino acid. In one such embodiment, the acid comprises a mineral acid, an organic acid or a combination of mineral acid(s) and/or organic acid(s). In another such embodiment, the base is ammonia or an organic base. In another such embodiment, the amino acid is an L-amino acid. In another such embodiment, the acid is a mixture of acids and the base is ammonia or an amine base. In another such embodiment, the acid is a mixture of acids and the amino acid is an L-amino acid. In another such embodiment, the acid is a mixture of acids, the base is ammonia or an amine base and the amino acid is an L-amino acid.

A further aspect the present disclosure is an acidifying composition for water and/or soil treatment wherein the acidifying composition comprises an acid, a base, and an additive. In one such embodiment, the acid comprises a mineral acid, an organic acid or a combination of mineral acid(s) and/or organic acid(s). In another such embodiment, the base is ammonia or an organic base. In another such embodiment, the additive is a plant growth regulator. In another such embodiment, the additive is a plant extract. In another such embodiment, the additive is a surfactant. In another such embodiment, the additive is a saponin. In another such embodiment, the acid is a mixture of acids and the base is ammonia or an amine base. In another such embodiment, the acid is a mixture of acids and the additive is a plant extract. In another such embodiment, the acid is a mixture of acids and the additive is a saponin. In another such embodiment, the additive comprises a *Yucca* extract. In another such embodiment, the acid is a mixture of acids, the base is ammonia or an amine base and the additive is a *Yucca* extract.

A further aspect of the present disclosure is an acidifying composition for water and/or soil treatment wherein the composition comprises an acid, a base, an amino acid and an additive. In one such embodiment, the acid comprises a mineral acid, an organic acid or a combination of mineral acid(s) and/or organic acid(s). In another such embodiment, the base is ammonia or an organic base. In another such embodiment, the amino acid is an L-amino acid. In another such embodiment, the additive is a plant growth regulator. In another such embodiment, the additive is a plant extract. In another such embodiment, the additive is a surfactant. In another such embodiment, the additive is a saponin. In another such embodiment, the acid is a mixture of acids and the base is ammonia or an amine base. In another such embodiment, the acid is a mixture of acids and the amino acid is an L-amino acid. In another such embodiment, the acid is a mixture of acids and the additive is a plant extract. In another such embodiment, the acid is a mixture of acids, the base is ammonia or an amine base, the amino acid is an L-amino acid and the additive is a *Yucca* extract.

A further aspect of the present disclosure is an acidifying composition for water and/or soil treatment wherein the composition comprises an acid mixture, a base, an amino acid and a natural surfactant. In one such embodiment, the acid mixture comprises citric acid. In another such embodiment, the base is ammonia or an organic base. In another such embodiment, the amino acid is an L-amino acid. In another such embodiment, the additive is a plant growth regulator. In another such embodiment, the additive is a plant extract. In another such embodiment, the additive is a surfactant. In another such embodiment, the additive is a saponin. In another such embodiment, the acid is a mixture of acids comprising citric acid and the base is ammonia or an amine base. In another such embodiment, the acid is a mixture of acids comprising citric acid and the amino acid is an L-amino acid. In another such embodiment, the acid is a mixture of acids comprising citric acid and the additive comprises Yucca extract. In another such embodiment, the acid is a mixture of acids comprising citric acid, the base is an amine base, the amino acid is an L-amino acid and the additive is a Yucca extract.

A further aspect of the present disclosure is an acidifying composition for water and/or soil treatment in which the composition comprises an acid mixture, a base, an amino acid and a natural surfactant. In one such embodiment, the acid mixture comprises glycolic acid. In another such embodiment, the organic base is an amine base. In another such embodiment, the amino acid is an L-amino acid. In another such embodiment, the additive is a plant growth regulator. In another such embodiment, the additive is a plant extract. In another such embodiment, the additive is a surfactant. In another such embodiment, the additive is a saponin. In another such embodiment, the acid is a mixture of acids comprising glycolic acid and the base is ammonia or an amine base. In another such embodiment, the acid is a mixture of acids comprising glycolic acid and the amino acid is an L-amino acid. In another such embodiment, the acid is a mixture of acids comprising glycolic acid and the additive is a Yucca extract. In another such embodiment, the acid is a mixture of acids comprising glycolic acid, the base is an amine base, the amino acid is an L-amino acid and the additive is a Yucca extract.

A further aspect of the present disclosure is an acidifying composition for water and/or soil treatment in which the composition comprises an acid mixture, a base, an amino acid and an additive. In one such embodiment, the acid mixture comprises glycolic acid and citric acid. In another such embodiment, the base is ammonia or an organic base. In another such embodiment, the amino acid is an L-amino acid. In another such embodiment, the additive is a plant growth regulator. In another such embodiment, the additive is a plant extract. In another such embodiment, the additive is a surfactant. In another such embodiment, the additive is a saponin. In another such embodiment, the acid is a mixture of acids comprising glycolic acid and citric acid and the base is ammonia or an amine base. In another such embodiment, the acid is a mixture of acids comprising glycolic acid and citric acid and the amino acid is an L-amino acid. In another such embodiment, the acid is a mixture of acids comprising glycolic acid and citric acid and the additive is a plant extract. In another such embodiment, the acid is a mixture of acids comprising glycolic acid and citric acid, the base is an amine base, the amino acid is an L-amino acid and the additive is a Yucca extract.

The foregoing and other features and advantages of the invention will be apparent to those of ordinary skill in the art from the following more particular description of the invention and the accompanying drawings.

DEFINITIONS

Figure 1:
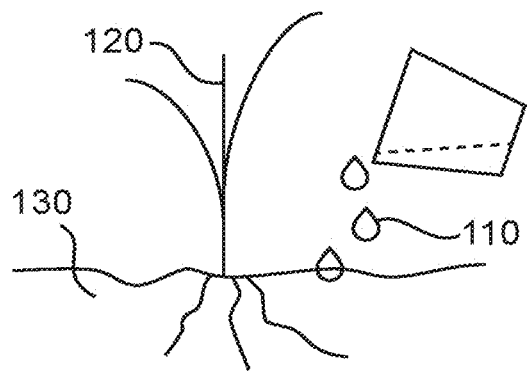
FIG. 1 shows a solution of an acidifying composition and water being added to soil.

"Alkylamine" as used herein is a compound having an amine functional group with a lone pair, further including a linear saturated monovalent hydrocarbon chain, covalently bound to the basic nitrogen atom (e.g., methyl, ethyl, propyl, and the like), or a branched saturated monovalent hydrocarbon chain covalently bound to the basic nitrogen atom. The hydrocarbon chain may comprise, for example, one to seven carbon atoms (e.g., $C_nH_{2n+1}$, where n=1-7) (e.g., 2-propyl, 2-butyl, 2-pentyl, and all other isomeric forms, respectively).

"Amendment" as used in connection with soil is any composition that, when combined with or otherwise added to a soil, modifies the physical and/or chemical properties of the soil. The amendment may, for example, modify the permeability, water absorption, drainage, aeration, structure, and/or other physical properties of the soil. The soil amendment may, alternatively or additionally, provide macronutrients or micronutrients for flora or fauna sustained or to be sustained by the soil.

"Amine" as used herein is an organic compound(s) or functional group(s) that includes a nitrogen atom with a lone pair. Amines are generally derivatives of ammonia, meaning, one or more hydrogen atoms of ammonia have been substituted with carbon atoms.

"Aromatic nitrogen heterocycle" as used herein is a nitrogen heterocycle characterized by a planar unsaturated ring of atoms that are stabilized by overlapping pi electrons. Typical aromatic nitrogen heterocycles include pyridine and its derivatives.

"Benzylalkonium chloride" as used herein refers to a N-alkyl-N-benzyl-N,N-dimethyl quaternary ammonium moiety. As used herein, the alkyl typically refers to $C_nH_{2n+1}$, where n=8, 10, 12, 14, 16, 18.

"Hydroxyalkyl" means a linear monovalent hydrocarbon chain or a branched monovalent hydrocarbon chain, substituted with one or two hydroxy groups, provided that if two hydroxy groups are present, both are not on the same carbon atom. The hydrocarbon chain may comprise, for example, one to seven carbon atoms (e.g., $C_nH_{2n+1}$, where n=1-7). Representative examples include, but are not limited to, hydroxymethyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 2,3-dihydroxybutyl, 3,4-dihydroxybutyl, and the like.

"N-hydroxyalkylamine" as used herein is an amine having one or more hydroxyalkyl substituents.

"Nitrogen heterocycle" as used herein is a saturated or unsaturated monocyclic group of one to seven carbon ring atoms in which at least one carbon ring atom is substituted by a nitrogen atom, and one or more other ring atoms are optionally substituted by oxygen.

"Organic acid" as used herein is an organic compound with acidic properties. As used herein, an organic acid having one carbon atom may be designated as a C1 organic acid. Non-limiting examples of C1 organic acids include formic acid and methanesulfonic acid. C1 organic acids, and organic acids containing additional carbon atoms (e.g., C10, C20, C30, etc.), may also include heteroatom substitutions. Non-limiting examples of heteroatoms include nitrogen, oxygen, sulfur, and halogens.

"Organic base" is an organic compound with basic properties. As used herein, an organic base having one carbon atom may be designated as a C1 organic base. A non-limiting examples of a C1 organic bases includes methylamine. C1 organic bases, and organic bases containing additional carbon atoms (e.g., C10, C20, C30, etc.), may also include heteroatom substitutions. Non-limiting examples of heteroatoms include nitrogen, oxygen, sulfur, and halogens.

"Organic compound" is any compound not classified as a carbide, carbonate, or cyanide, and other than carbon monoxide and carbon dioxide in which one or more atoms of carbon are covalently linked to atoms of other elements, most commonly hydrogen, oxygen or nitrogen.

"Phosphoric acid ester" as used herein refers to phosphoric acid molecules that have condensed with one or more alcohol functional groups of alkyl alcohols, forming mono-, di-, or tri-alkyl phosphate esters, respectively "Saponin" as used herein refers to amphipathic glycosides composed of one or more hydrophilic glycoside moieties combined with a lipophilic triterpene derivative.

"Sulfosuccinic acid" as used herein is a derivative of succinic acid wherein one of the methylene moieties in succinic acid is sulphonated.

"Surfactant amine" as used herein refers to a surfactant that includes an amine functionality as defined above.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

DETAILED DESCRIPTION

The disclosed invention relates to soil and water treatment compounds, specifically to an acidifying composition used to treat soil or irrigation water. The soil can be used for growing plants, for example. The disclosed acidifying composition includes an organic acid. The acidifying composition is used to control and manage conditions in irrigation water and soil to prevent, e.g., sodic deterioration of soil structure. Treatment of soil and/or irrigation water with the acidifying composition leads to improved growth and quality of plants grown in the soil treated with the acidifying composition. The acidifying composition reacts with calcium carbonates and bicarbonates in water and soil, releasing calcium ions, which are now free to replace sodium on soil particle exchange sites.

Releasing calcium ions so they are available to replace sodium on soil particle exchange sites is an important step in reclaiming sodic soils. In accordance with the present disclosure, an acidifying composition may be used for one or more of such purposes.

Irrigation water containing excessive levels of sodium, carbonate, and other ions can pose major problems for farmers, ranchers, turfgrass managers, and crop managers. Calcium plays a key positive role in soil structure. Calcium and other polyvalent cations, such as magnesium, are strongly attracted to negative sites on soil surfaces, where they form ion bridges that hold soil particles together, restrict swelling, and prevent soil dispersion. Calcium also contributes positively to plant growth and health. Thus, calcium, magnesium, and similar polyvalent cations are a contributor to positive soil quality and plant growth.

Unfortunately, high carbonate ($CO_3^{2-}$) and other anions (e.g., phosphate) levels in water decrease the availability of calcium and magnesium in the soil solution. Carbonate and other anions, with their negative charges, are strongly attracted to the positive charges of calcium and magnesium, and form insoluble precipitates of calcium carbonate ($CaCO_3$) and magnesium carbonate ($MgCO_3$) when the soil solution concentrates during soil drying. A similar reaction occurs between the anionic phosphate and cations like $Mg^{2+}$ and $Ca^{2+}$. This chemical attraction results in the formation of insoluble salts, and prevents calcium from being available to the soil and the plants. In addition, these anions strip calcium from soil sites and the open soil sites attract sodium cations. When the sodium cations occupy the soil sites, this causes dispersion of soil particles, the breakdown of soil aggregates, and causes the soil to become hard and compact when dry. This "sodic" soil will become increasingly impervious to water penetration and inhibit water percolation. The buildup of insoluble salts in water and soil contributes to decreased soil aeration, decreased soil percolation, decreased soil drainage, and negatively affects crops grown in the soil. Soil scientists recognize that prevention and reclamation of sodic soils can be initiated with the replacement of excess sodium by another cation, such as calcium.

The disclosed acidifying composition is used to control and manage conditions in irrigation water and soil to prevent sodic deterioration of soil structure. The disclosed acidifying composition increases the amount of free calcium ions in the soil that can bind with soil sites and prevent or reclaim sodic soil. Treatment of soil and/or irrigation water with the acidifying composition leads to increased levels of free calcium ions that can be bonded with soil sites and absorbed by plant roots, and can contribute to plant growth and health.

In one embodiment, the disclosed acidifying composition comprises an organic acid. The acidifying composition can be a liquid or a solid. In some embodiments, the acidifying composition is mixed with water to form a solution. In some embodiments, the acidifying composition includes a calcium source. In some embodiments, the calcium source is gypsum or lime. In some embodiments, the acidifying composition is mixed with a calcium source such as gypsum or lime. In some embodiments, the disclosed acidifying composition includes a coordinating agent that coordinates calcium ions to prevent their involvement with other ions such as carbonates. Sequestration of calcium ions increases the efficiency of calcium compounds that are added to the soil. Sequestration of calcium ions also increases plant root uptake of calcium by plants in soil treated with the acidifying composition. In some embodiments, the coordinating agent is a chelator.

The acidifying composition can be applied to soil in many different ways. In some embodiments, the acidifying composition is mixed with irrigation water that is applied to soil, as shown in FIG. 1. FIG. 1 shows an acidifying composition 110 being applied to soil 130. A plant 120 is growing in soil 130. Acidifying composition 110 in this embodiment is mixed with water. Acidifying composition 110 can be mixed with water in many different ways. Acidifying composition 110 can be injected into irrigation water, for example.

Figure 2:
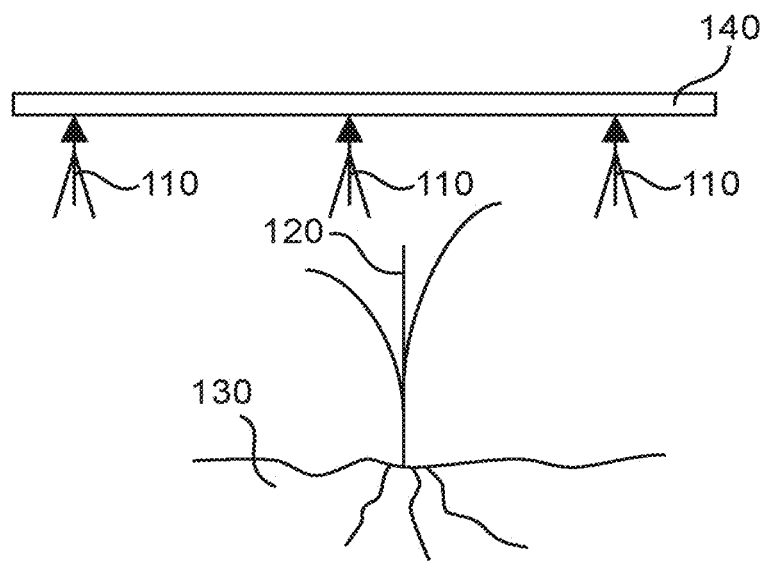
FIG. 2 shows a solution of an acidifying composition and water being sprayed on soil being used to grow a plant.

In some embodiments, the acidifying composition 110 is applied by a boom spray to soil, as shown in FIG. 2. FIG. 2 shows acidifying composition 110 being applied to soil 130 via a boom sprayer 140. In this embodiment, water can be added to soil 130 with acidifying composition 110, or separately as irrigation water, or both.

Figure 3:
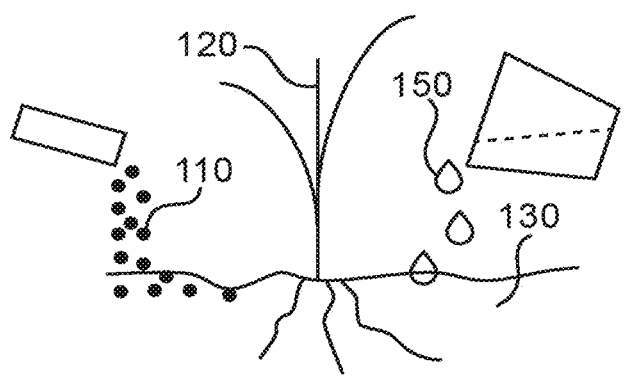
FIG. 3 shows a solid acidifying composition being mixed with soil, with water also being added to the soil. The soil is being used to grow a plant.

In some embodiments, the acidifying composition is applied to soil as a solid, either before, or concurrently with, water being applied to the soil, as shown in FIG. 3. FIG. 3 shows acidifying composition 110 being applied to soil 130 as a solid material, with water 150 being applied separately.

When the acidifying composition is present with a mixture of soil and water, the acidifying composition reacts with carbonates and bicarbonates, forming water and carbon dioxide, and leaving the calcium and magnesium in solution. The acidifying composition also increases the solubility of gypsum ($CaSO_4.2H_2O$) or lime ($CaCO_3$) in water and increases their availability to plants and soil. When added to irrigation water, the acidifying composition solubilizes calcium from calcium carbonates and calcium bicarbonate in the water and in the soil. The acidifying composition reacts with the insoluble calcium salts, releasing calcium ions, water, and carbon dioxide. The calcium ions are now free to replace sodium ions on soil particle exchange sites Unlike sulfur and sulfur-based acids that can be difficult to handle, can increase the sulfate content of the soil, and may trigger black layer formation, the acidifying composition is easy to handle and will not add to the sulfate content of the soil. The acidifying composition can be used alone, or in conjunction with a calcium source such as, for example but not by way of limitation, gypsum or lime.

Figure 4:
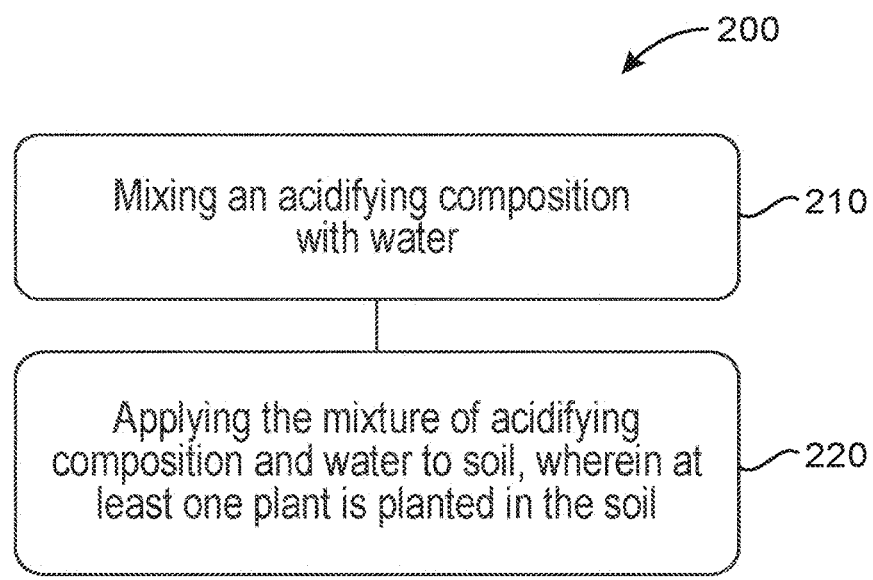
FIG. 4 illustrates a method of promoting plant growth, conditioning soil, fertilizing plants, or conditioning irrigation water.

FIG. 4 illustrates a method 200 of promoting plant growth, conditioning soil, fertilizing plants, or conditioning irrigation water, where method 200 comprises step 210 of mixing an acidifying composition with water, and step 220 of applying the mixture of acidifying composition and water to soil, wherein at least one plant is planted in the soil. In some embodiments, the acidifying composition includes an organic acid. In some embodiments, the acidifying composition includes a sequestering agent, which can be a chelator. In some embodiments, method 200 includes adding a source of calcium to the soil. In some embodiments, the calcium source is one of gypsum or lime. Method 200 can include many other steps.

Figure 5:
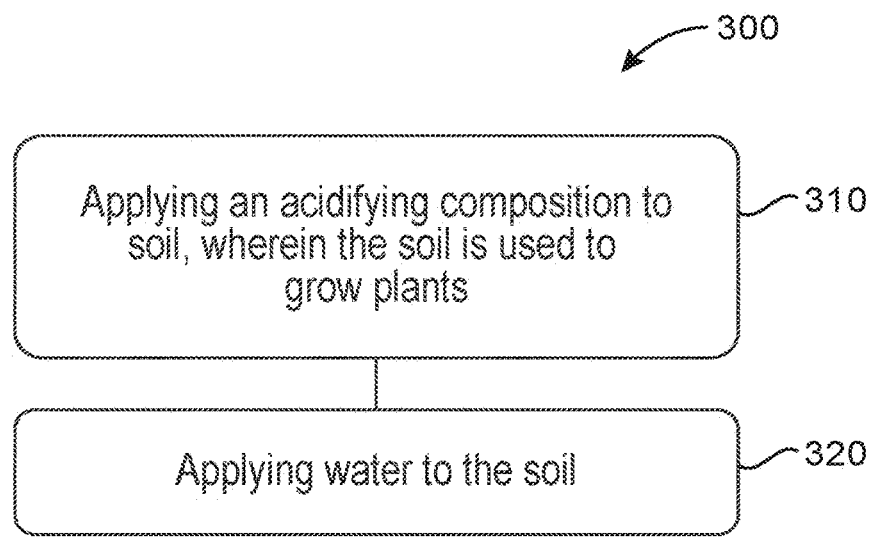
FIG. 5 illustrates a method of conditioning soil used to grow plants, promote plant growth, or fertilize plants.

FIG. 5 illustrates a method 300 of conditioning soil used to grow plants, promote plant growth, or fertilize plants, where the method comprises step 310 of applying an acidifying composition to soil, where the soil is used to grow plants; and step 320 of applying water to the soil. In some embodiments, the acidifying composition includes an organic acid. In some embodiments, the acidifying composition includes a sequestering agent, which can be a chelator. In some embodiments, method 300 includes adding a source of calcium to the soil. In some embodiments, the calcium source is one of gypsum or lime. Method 300 can include many other steps.

As described in connection with FIGS. 1 to 5, the acidifying composition may be used in the treatment of a wide range of soils used for the cultivation of any of a wide range of crops. As noted, the acidifying composition may be applied to the soil as a liquid or solid, and may be in the form of a concentrate or combined with a diluent (solid or liquid). For example, in some embodiments, the acidifying composition may be a concentrate in form of a solid (e.g., a free-flowing powder or an agglomerate), a semisolid, or a liquid. If in solid form, the concentrate may be amorphous, crystalline, or a combination thereof. If in liquid form, the concentrate may be a mixture of solid or liquid component forms resulting in a liquid, oil, paste, emulsion, suspension, or the like, without limitation.

In general, the acidifying composition comprises an acid. For example, in one embodiment, the acidifying composition comprises a mineral acid or an organic acid, or a combination thereof. In certain embodiments, the acid may function as a chelator or a sequestering agent for calcium or other ions. Exemplary mineral acids include hydrochloric acid, hydrobromic acid, hydrofluoric acid, perchloric acid, sulfuric acid, sulfurous acid, phosphoric acid, polyphosphoric acid, nitric acid, chromic acid, boric acid, and the like. Exemplary organic acids include sulfonic acids and carboxylic acids. In one such exemplary embodiment, the acidifying composition comprises a C1-C20 organic acid. In one such exemplary embodiment, the acidifying composition comprises a C1-C7 organic acid. By way of further example, in one such embodiment, the acidifying composition comprises a C1-C7 sulfonic acid. By way of further example, in one such embodiment, the acidifying composition comprises a C1-C7 sulfonic acid selected from the group consisting of methanesulfonic acid ($CH_3SO_3H$), benzene sulfonic acid ($C_6H_5SO_3H$), and toluenesulfonic acid ($CH_3C_6H_4SO_3H$). By way of further example, in one such embodiment, the acidifying composition comprises a C1-C20 carboxylic acid. By way of further example, in one such embodiment, the acidifying composition comprises a C1-C7 carboxylic acid. In one such exemplary embodiment, the acidifying composition comprises a C1-C20 carboxylic acid selected from the group consisting of formic acid (HCOOH), acetic acid ($CH_3COOH$), glycolic acid ($HOCH_2COOH$), oxalic acid (HOOCCOOH), propionic acid ($CH_3CH_2COOH$), lactic acid ($C_2H_4OHCOOH$), fumaric acid ($HO_2CCH=CHCO_2H$), butyric acid ($CH_3CH_2CH_2COOH$), tartaric acid ($C_4H_6O_6$), succinic acid ($HOOC(CH_2)_2COOH$), valeric acid ($C_5H_{10}O_2$), citric acid ($C_6H_8O_7$), caproic acid ($C_6H_{12}O_2$), gluconic acid ($HOCH_2(CHOH)_4COOH$), enanthic acid ($CH_3(CH_2)_5COOH$), benzoic acid ($C_7H_6O_2$), salicylic acid ($C_7H_6O_3$), malic acid ($C_4H_6O_5$), linoleic acid ($C_{18}H_{32}O_2$), linolenic acid ($C_{18}H_{30}O_2$), arachidonic acid ($C_{20}H_{32}O_2$), jasmonic acid ($C_{12}H_{18}O_3$), and combinations thereof. In another such exemplary embodiment, the acidifying composition comprises a C1-C7 carboxylic acid selected from the group consisting of formic acid (HCOOH), acetic acid ($CH_3COOH$), glycolic acid ($HOCH_2COOH$), oxalic acid (HOOCCOOH), propionic acid ($CH_3CH_2COOH$), lactic acid ($C_2H_4OHCOOH$), fumaric acid ($HO_2CCH=CHCO_2H$), butyric acid ($CH_3CH_2CH_2COOH$), tartaric acid ($C_4H_6O_6$), succinic acid ($HOOC(CH_2)_2COOH$), valeric acid ($C_5H_{10}O_2$), citric acid ($C_6H_8O_7$), caproic acid ($C_6H_{12}O_2$), gluconic acid ($HOCH_2(CHOH)_4COOH$), enanthic acid ($CH_3(CH_2)_5COOH$), benzoic acid ($C_7H_6O_2$), salicylic acid ($C_7H_6O_3$), malic acid ($C_4H_6O_5$), and combinations thereof. By way of further example, in one such embodiment, the acidifying composition comprises a C1-C7 carboxylic acid selected from the group consisting of formic acid (HCOOH), acetic acid ($CH_3COOH$), glycolic acid ($HOCH_2COOH$), oxalic acid (HOOCCOOH), propionic acid ($CH_3CH_2COOH$), lactic acid ($C_2H_4OHCOOH$), fumaric acid ($HO_2CCH=CHCO_2H$), butyric acid ($CH_3CH_2CH_2COOH$), tartaric acid ($C_4H_6O_6$), succinic acid ($HOOC(CH_2)_2COOH$), valeric acid ($C_5H_{10}O_2$), citric acid ($C_6H_8O_7$), caproic acid ($C_6H_{12}O_2$), gluconic acid ($HOCH_2(CHOH)_4COOH$), and combinations thereof. By way of further example, in one such embodiment, the acidifying composition comprises a carboxylic acid selected from the group consisting of formic acid (HCOOH), acetic acid ($CH_3COOH$), glycolic acid ($HOCH_2COOH$), oxalic acid (HOOCCOOH), propionic acid ($CH_3CH_2COOH$), lactic acid ($C_2H_4OHCOOH$), fumaric acid ($HO_2CCH=CHCO_2H$), butyric acid ($CH_3CH_2CH_2COOH$), tartaric acid ($C_4H_6O_6$), citric acid ($C_6H_8O_7$), and combinations thereof. By way of further example, in one such embodiment, the acidifying composition comprises a carboxylic acid selected from the group consisting of formic acid (HCOOH), acetic acid ($CH_3COOH$), glycolic acid ($HOCH_2COOH$), oxalic acid (HOOCCOOH), propionic acid ($CH_3CH_2COOH$), butyric acid ($CH_3CH_2CH_2COOH$), citric acid ($C_6H_8O_7$), and combinations thereof.

When the acidifying composition comprises two or more acids, e.g., a mineral acid and an organic acid, two or more organic acids, two or more sulfonic acids, or even two or more carboxylic acids, the acids may be present in a range of relative ratios. For example, in one embodiment, the acidifying composition comprises a mineral acid and an organic acid wherein the molar ratio of the two is in the range of 1:10 to 10:1, respectively. By way of further example, in one embodiment, the acidifying composition comprises two organic acids wherein the molar ratio of the two is in the range of 1:10 to 10:1, respectively. By way of further example, in one embodiment, the acidifying composition comprises two sulfonic acids wherein the molar ratio of the two is in the range of 1:10 to 10:1, respectively. By way of further example, in one embodiment, the acidifying composition comprises two carboxylic acids wherein the molar ratio of the two is in the range of 1:10 to 10:1, respectively.

In one exemplary embodiment, the acidifying composition comprises citric acid and an organic acid (other than citric acid) and the molar ratio of citric acid to the organic acid is in the range of about 1:10 to about 10:1, respectively. By way of further example, in one embodiment the acidifying composition comprises citric acid and an organic acid (other than citric acid) and the molar ratio of citric acid to the organic acid is in the range of about 1:9 to about 9:1, respectively. By way of further example, in one embodiment the acidifying composition comprises citric acid and an organic acid (other than citric acid) and the molar ratio of citric acid to the organic acid is in the range of about 1:8 to about 8:1, respectively. By way of further example, in one embodiment the acidifying composition comprises citric acid and an organic acid (other than citric acid) and the molar ratio of citric acid to the organic acid is in the range of about 1:7 to about 7:1, respectively. By way of further example, in one embodiment the acidifying composition comprises citric acid and an organic acid (other than citric acid) and the molar ratio of citric acid to the organic acid is in the range of about 1:6 to about 6:1, respectively. By way of further example, in one embodiment the acidifying composition comprises citric acid and an organic acid (other than citric acid) and the molar ratio of citric acid to the organic acid is in the range of about 1:5 to about 5:1, respectively. By way of further example, in one embodiment the acidifying composition comprises citric acid and an organic acid (other than citric acid) and the molar ratio of citric acid to the organic acid is in the range of about 1:4 to about 4:1, respectively. By way of further example, in one embodiment the acidifying composition comprises citric acid and an organic acid (other than citric acid) and the molar ratio of citric acid to the organic acid is in the range of about 1:3 to about 3:1, respectively. By way of further example, in one embodiment the acidifying composition comprises citric acid and an organic acid (other than citric acid) and the molar ratio of citric acid to the organic acid is in the range of about 1:2 to about 2:1, respectively. By way of further example, in one embodiment the acidifying composition comprises citric acid and an organic acid (other than citric acid) and the molar ratio of citric acid to the organic acid is about 1:1, respectively. In each of the foregoing exemplary embodiments identified in this paragraph, the other organic acid may be selected from the group consisting of formic acid (HCOOH), acetic acid ($CH_3COOH$), glycolic acid ($HOCH_2COOH$), oxalic acid (HOOCCOOH), propionic acid ($CH_3CH_2COOH$), lactic acid ($C_2H_4OHCOOH$), fumaric acid ($HO_2CCH=CHCO_2H$), butyric acid ($CH_3CH_2CH_2COOH$), tartaric acid ($C_4H_6O_6$), succinic acid ($HOOC(CH_2)_2COOH$), valeric acid ($C_5H_{10}O_2$), caproic acid ($C_6H_{12}O_2$), gluconic acid ($HOCH_2(CHOH)_4COOH$) and jasmonic acid ($C_{12}H_{18}O_3$). In each of the foregoing exemplary embodiments identified in this paragraph, the other organic acid may be selected from the group consisting of formic acid (HCOOH), acetic acid ($CH_3COOH$), glycolic acid ($HOCH_2COOH$), oxalic acid (HOOCCOOH), propionic acid ($CH_3CH_2COOH$), lactic acid ($C_2H_4OHCOOH$), fumaric acid ($HO_2CCH=CHCO_2H$), butyric acid ($CH_3CH_2CH_2COOH$), and tartaric acid ($C_4H_6O_6$). In each of the foregoing exemplary embodiments identified in this paragraph, the other organic acid may be selected from the group consisting of formic acid (HCOOH), acetic acid ($CH_3COOH$), glycolic acid ($HOCH_2COOH$), oxalic acid (HOOCCOOH), propionic acid ($CH_3CH_2COOH$), and butyric acid ($CH_3CH_2CH_2COOH$).

In one exemplary embodiment, the acidifying composition comprises glycolic acid and an organic acid (other than glycolic acid) and the molar ratio of glycolic acid to the organic acid is in the range of about 1:10 to about 10:1, respectively. By way of further example, in one embodiment the acidifying composition comprises glycolic acid and an organic acid (other than glycolic acid) and the molar ratio of glycolic acid to the organic acid is in the range of about 1:9 to about 9:1, respectively. By way of further example, in one embodiment the acidifying composition comprises glycolic acid and an organic acid (other than glycolic acid) and the molar ratio of glycolic acid to the organic acid is in the range of about 1:8 to about 8:1, respectively. By way of further example, in one embodiment the acidifying composition comprises glycolic acid and an organic acid (other than glycolic acid) and the molar ratio of glycolic acid to the organic acid is in the range of about 1:7 to about 7:1, respectively. By way of further example, in one embodiment the acidifying composition comprises glycolic acid and an organic acid (other than glycolic acid) and the molar ratio of glycolic acid to the organic acid is in the range of about 1:6 to about 6:1, respectively. By way of further example, in one embodiment the acidifying composition comprises glycolic acid and an organic acid (other than glycolic acid) and the molar ratio of glycolic acid to the organic acid is in the range of about 1:5 to about 5:1, respectively. By way of further example, in one embodiment the acidifying composition comprises glycolic acid and an organic acid (other than glycolic acid) and the molar ratio of glycolic acid to the organic acid is in the range of about 1:4 to about 4:1, respectively. By way of further example, in one embodiment the acidifying composition comprises glycolic acid and an organic acid (other than glycolic acid) and the molar ratio of glycolic acid to the organic acid is in the range of about 1:3 to about 3:1, respectively. By way of further example, in one embodiment the acidifying composition comprises glycolic acid and an organic acid (other than glycolic acid) and the molar ratio of glycolic acid to the organic acid is in the range of about 1:2 to about 2:1, respectively. By way of further example, in one embodiment the acidifying composition comprises glycolic acid and an organic acid (other than glycolic acid) and the molar ratio of glycolic acid to the organic acid is about 1:1, respectively. In each of the foregoing exemplary embodiments identified in this paragraph, the other organic acid may be selected from the group consisting of formic acid (HCOOH), acetic acid ($CH_3COOH$), oxalic acid (HOOCCOOH), propionic acid ($CH_3CH_2COOH$), lactic acid ($C_2H_4OHCOOH$), fumaric acid ($HO_2CCH=CHCO_2H$), butyric acid ($CH_3CH_2CH_2COOH$), tartaric acid ($C_4H_6O_6$), succinic acid ($HOOC(CH_2)_2COOH$), valeric acid ($C_5H_{10}O_2$), citric acid ($C_6H_8O_7$), caproic acid ($C_6H_{12}O_2$), gluconic acid ($HOCH_2(CHOH)_4COOH$) and jasmonic acid ($C_{12}H_{18}O_3$). In each of the foregoing exemplary embodiments identified in this paragraph, the other organic acid may be selected from the group consisting of formic acid (HCOOH), acetic acid ($CH_3COOH$), oxalic acid (HOOCCOOH), propionic acid ($CH_3CH_2COOH$), lactic acid ($C_2H_4OHCOOH$), fumaric acid ($HO_2CCH=CHCO_2H$), butyric acid ($CH_3CH_2CH_2COOH$), and tartaric acid ($C_4H_6O_6$). In each of the foregoing exemplary embodiments identified in this paragraph, the other organic acid may be selected from the group consisting of formic acid (HCOOH), acetic acid ($CH_3COOH$), oxalic acid (HOOCCOOH), propionic acid ($CH_3CH_2COOH$), and butyric acid ($CH_3CH_2CH_2COOH$).

In one exemplary embodiment, the acidifying composition comprises glycolic acid and citric acid and the molar ratio of glycolic acid to the citric acid is in the range of about 1:10 to about 10:1, respectively. By way of further example, in one embodiment the acidifying composition comprises glycolic acid and citric acid and the molar ratio of glycolic acid to citric acid is in the range of about 1:9 to about 9:1, respectively. By way of further example, in one embodiment the acidifying composition comprises glycolic acid and citric and the molar ratio of glycolic acid to citric acid is in the range of about 1:8 to about 8:1, respectively. By way of further example, in one embodiment the acidifying composition comprises glycolic acid and citric acid and the molar ratio of glycolic acid to citric acid is in the range of about 1:7 to about 7:1, respectively. By way of further example, in one embodiment the acidifying composition comprises glycolic acid and citric and the molar ratio of glycolic acid to citric acid is in the range of about 1:6 to about 6:1, respectively. By way of further example, in one embodiment the acidifying composition comprises glycolic acid and citric and the molar ratio of glycolic acid to citric acid is in the range of about 1:5 to about 5:1, respectively. By way of further example, in one embodiment the acidifying composition comprises glycolic acid and citric and the molar ratio of glycolic acid to citric acid is in the range of about 1:4 to about 4:1, respectively. By way of further example, in one embodiment the acidifying composition comprises glycolic acid and citric and the molar ratio of glycolic acid to citric acid is in the range of about 1:3 to about 3:1, respectively. By way of further example, in one embodiment the acidifying composition comprises glycolic acid and citric and the molar ratio of glycolic acid to citric acid is in the range of about 1:2 to about 2:1, respectively. By way of further example, in one embodiment the acidifying composition comprises glycolic acid and citric and the molar ratio of glycolic acid to citric acid is about 1:1, respectively. In each of the foregoing exemplary embodiments, the acidifying composition may further comprise one or more mineral or other organic acids as previously described.

In general, the acidifying composition may further include a base. The base, for example, may be ammonia or an organic base. In certain embodiments, the base may function as a chelator or a sequestering agent for calcium or other ions. In one embodiment, the base is ammonia, an amine base such as a surfactant amine, a nitrogen heterocycle, an alkylamine, or a combination thereof. Exemplary surfactant amines include N-hydroxyalkylamines. Exemplary nitrogen heterocycles include aromatic nitrogen heterocycles. Exemplary alkylamines include secondary alkylamines and saturated cyclic amines. In one such exemplary embodiment, the acidifying composition further comprises a C2-C20 N-hydroxyalkylamine. By way of further example, in one such embodiment, the acidifying composition further comprises a C2-C20 aromatic nitrogen heterocycle. By way of further example, in one such embodiment, the acidifying composition further comprises a C2-C20 secondary alkylamine. By way of further example, in one such embodiment, the acidifying composition further comprises a C2-C20 saturated cyclic amine. By way of further example, in one such embodiment, the acidifying composition further comprises a C2-C20 N-hydroxyalkylamine selected from the group consisting of monoethanolamine, isopropanolamine, triethanolamine, triisopropanolamine, and tetraethanolethylenediamine, and combinations thereof. By way of further example, in one such embodiment, the acidifying composition further comprises a C2-C20 aromatic nitrogen heterocycle selected from the group consisting of imidazole and 3-picoline, and combinations thereof. By way of further example, in one such embodiment, the acidifying composition further comprises a C2-C20 secondary alkylamine including, without limitation, diethylamine. By way of further example, in one such embodiment, the acidifying composition further comprises a C2-C20 saturated cyclic amine including, without limitation, morpholine. By way of further example, in one such embodiment, the acidifying composition further comprises a C2-C20 N-hydroxyalkylamine selected from the group consisting of monoethanolamine, isopropanolamine, triethanolamine, and triisopropanolamine, and combinations thereof. By way of further example, in one such embodiment, the acidifying composition further comprises a C2-C20 N-hydroxyalkylamine selected from the group consisting of triethanolamine and triisopropanolamine. By way of further example, in one such embodiment, the acidifying composition further comprises imidazole. By way of further example, in one such embodiment, the acidifying composition further comprises 3-picoline. In each of the foregoing exemplary embodiments, any of the organic bases may function as a chelator or a sequestering agent.

The acidifying composition may optionally comprise two or more bases. When the acidifying composition comprises two or more bases, e.g., ammonia and a surfactant amine, two or more surfactant amines, two or more nitrogen heterocycles, or even two or more alkylamines, the amines may be present in a range of relative ratios. For example, in one embodiment, the acidifying composition further comprises ammonia and a surfactant amine wherein the molar ratio of the two is in the range of 1:10 to 10:1, respectively. By way of further example, in one embodiment, the acidifying composition further comprises two or more surfactant amines wherein the molar ratio of the two is in the range of 1:10 to 10:1, respectively. By way of further example, the acidifying composition further comprises two or more nitrogen heterocycles wherein the molar ratio of the two is in the range of 1:10 to 10:1, respectively. By way of further example, the acidifying composition further comprises a nitrogen heterocycle and an alkylamine wherein the molar ratio of the two is in the range of 1:10 to 10:1, respectively. By way of further example, in one embodiment, the acidifying composition further comprises two or more alkylamines wherein the molar ratios of at least two of the alkylamines is in the range of 1:10 to 10:1, respectively.

In one exemplary embodiment, the acidifying composition further comprises a first organic base selected from among monoethanolamine, triethanolamine, triisopropanolamine and isopropanolamine, and at least one other (different) organic base selected from among C2-C20 N-hydroxyalkylamines. In one such embodiment the molar ratio of the first organic base to the other C2-C20 hydroxyalkylamine is in the range of about 1:10 to about 10:1, respectively.

In one exemplary embodiment, the acidifying composition comprises triethanolamine. Optionally, the acidifying composition may additionally comprise at least one other organic base such as a C2-C20 N-hydroxyalkylamine. In one such embodiment, the molar ratio of triethanolamine to the other organic base is in the range of about 1:10 to about 10:1, respectively.

In general, the acidifying composition may further comprise an amino acid. The amino acid, for example, may be one or more of the naturally encoded amino acids and/or one or more non-naturally encoded amino acids. The amino acid(s) may, for example, be present as a racemic mixture or an optically active mixture of the D- or L-isomers. In one such exemplary embodiment, the acidifying composition further comprises an L-amino acid selected from the group consisting of arginine, histidine, lysine, aspartic acid, glutamic acid, serine, threonine, asparagine, glutamine, cysteine, selenocysteine, glycine, proline, alanine, isoleucine, leucine, methionine, phenylalanine, tryptophan, tyrosine, valine, and combinations thereof. By way of further example, in one such embodiment, the acidifying composition further comprises a D-amino acid selected from the group consisting of arginine, histidine, lysine, aspartic acid, glutamic acid, serine, threonine, asparagine, glutamine, cysteine, selenocysteine, glycine, proline, alanine, isoleucine, leucine, methionine, phenylalanine, tryptophan, tyrosine, valine, and combinations thereof. By way of further example, in one such embodiment, the acidifying composition further comprises an L-amino acid selected from the group consisting of asparagine, glutamine, histidine, and tryptophan, and combinations thereof. By way of further example, in one such embodiment, the acidifying composition further comprises an L-amino acid selected from the group consisting of asparagine and glutamine. By way of further example, in one such embodiment, the acidifying composition further comprises a D-amino acid selected from the group consisting of asparagine, glutamine, histidine, and tryptophan, and combinations thereof. By way of further example, in one such embodiment, the acidifying composition further comprises a D-amino acid selected from the group consisting of asparagine and glutamine.

When the acidifying composition comprises two or more compositionally distinct amino acids, the amino acids may be present in a range of relative ratios. For example, in one embodiment, the acidifying composition further comprises a first amino acid and a chemically distinct second amino acid wherein the molar ratio of the two is in the range of 1:10 to 10:1, respectively.

In one exemplary embodiment, the acidifying composition comprises L-asparagine and a second amino acid (other than L-asparagine) and the molar ratio of L-asparagine to the second amino acid is in the range of about 1:10 to about 10:1, respectively. By way of further example, in one embodiment, the acidifying composition further comprises L-asparagine and a second amino acid (other than L-asparagine) and the molar ratio of the L-asparagine to the second amino acid is in the range of about 1:9 to about 9:1, respectively.

In one exemplary embodiment, the acidifying composition comprises L-glutamine and a second amino acid (other than L-glutamine) and the molar ratio of L-glutamine to the second amino acid is in the range of about 1:10 to about 10:1, respectively. By way of further example, in one embodiment, the acidifying composition further comprises L-glutamine and a second amino acid (other than L-glutamine) and the molar ratio of the L-glutamine to the second amino acid is in the range of about 1:9 to about 9:1, respectively.

In one exemplary embodiment, the acidifying composition comprises L-methionine and a second amino acid (other than L-methionine) and the molar ratio of L-methionine to the second amino acid is in the range of about 1:10 to about 10:1, respectively. By way of further example, in one embodiment, the acidifying composition further comprises L-methionine and a second amino acid (other than L-methionine) and the molar ratio of the L-methionine to the second amino acid is in the range of about 1:9 to about 9:1, respectively.

In one exemplary embodiment, the acidifying composition comprises L-tryptophan and a second amino acid (other than L-tryptophan) and the molar ratio of L-tryptophan to the second amino acid is in the range of about 1:10 to about 10:1, respectively. By way of further example, in one embodiment, the acidifying composition further comprises L-tryptophan and a second amino acid (other than L-tryptophan) and the molar ratio of the L-tryptophan to the second amino acid is in the range of about 1:9 to about 9:1, respectively. In each of the foregoing exemplary embodiments, the amino acid may be, for example, a sodium salt of the amino acid as previously described (in the aforementioned ratios).

In general, the acidifying composition comprises an additive. Exemplary additives include plant growth regulators, plant extracts, surfactants, calcium-containing additives, magnesium-containing additives, jasmonic acid derivatives (e.g., salts, esters, or amides thereof), and carbon-containing additives such as carbohydrates. In one exemplary embodiment, the additive comprises a plant growth regulator selected from the group consisting of auxins, cytokinins, gibberellins, ethylene, and abscisic acid. In one such exemplary embodiment, the additive comprises a calcium-containing additive such as lime, gypsum, or other suitable calcium-source. In one such exemplary embodiment, a magnesium-containing additive includes Epsom salts, or other suitable magnesium-source. In one such exemplary embodiment, the additive comprises a jasmonic acid derivative such as methyl jasmonate or other alkyl jasmonate. In one such exemplary embodiment, the additive comprises a carbon source such as inositol; for example, an inositol may be selected from the group consisting of myo-inositol, scyllo-inositol, muco-inositol, D-chiro-inositol, L-chiro-inositol, neo-inositol, allo-inositol, epi-inositol, and cis-inositol. By way of further example, in one embodiment, an inositol may be selected from the group consisting of myo-inositol, scyllo-inositol, muco-inositol, neo-inositol, allo-inositol, epi-inositol, and cis-inositol. By way of further example, in one embodiment, an inositol may be selected from the group consisting of myo-inositol, neo-inositol, and allo-inositol. In certain embodiments, the additive may be incorporated as an optional component of the acidifying composition. For example, the additive included as a component of the acidifying composition may improve the physical characteristics of the acidifying composition (e.g., solubility, odor, friability, etc.). In certain embodiments, the additive may also be a component of the irrigation composition described herein. In other embodiments, inclusion of the additive within the irrigation composition may improve the application times of the soil treatment (e.g., less time spent applying the additive first, and then the irrigation conditioner or amendment composition).

In one exemplary embodiment, the additive is a plant extract. Exemplary plant extracts include yarrow extract and plant extracts containing a saponin. In one such embodiment, the acidifying composition comprises a saponin derived from a tea plant or a plant in the Sapindaceae (e.g., lychee), Quillajaceae, (e.g., soapbark), Agavaceae (e.g., yuccas) or *Saponaria* (soapwort) families. In one exemplary embodiment, the acidifying composition further comprises *Yucca schidigera* extract. In another exemplary embodiment, the acidifying composition further comprises *Quillaja saponaria* extract. In still another exemplary embodiment, the acidifying composition further comprises *quillaja* bark extract. In yet still another exemplary embodiment, the acidifying composition further comprises *Saponaria* (soapwort) extract.

In one exemplary embodiment, the additive is a surfactant. saponin-rich plant extracts and other plant extracts exhibit surfactant-like properties. Exemplary non-natural surfactant include ionic surfactant, non-ionic surfactant, and amphoteric surfactant. Exemplary ionic surfactants include sodium lauryl sulfate, sodium stearate, and sodium dodecyl sulfate. Exemplary non-ionic surfactants include lauryl glucoside, decyl glucoside, sorbitan tristate, and octylphenoxypolyethoxyethanol. Exemplary amphoteric surfactants include Sodium lauroamphoacetate, dodecyl amino propionic acid, betaine and its alkyl derivitives (e.g. lauryl betaine, steryl betaine, cocamidopropyl betaine, etc.).

In one exemplary embodiment, the acidifying composition comprises *Yucca schidigera* extract and at least one other additive (such as another plant extract) and the weight ratio of *Yucca schidigera* extract to the other extract is in the range of about 1:10 to about 10:1, respectively. By way of further example, in one embodiment, the acidifying composition comprises *Yucca schidigera* extract and a plant extract (other than *Yucca schidigera* extract) and the weight ratio of *Yucca schidigera* extract to the other plant extract(s) is in the range of about 1:9 to about 9:1, respectively. By way of further example, in one embodiment, the acidifying composition comprises *Yucca schidigera* extract and a plant extract (other than *Yucca schidigera* extract) and the weight ratio of *Yucca schidigera* extract to the other plant extract(s) is in the range of about 1:8 to about 8:1, respectively. By way of further example, in one embodiment, the acidifying composition comprises *Yucca schidigera* extract and a plant extract (other than *Yucca schidigera* extract) and the weight ratio of *Yucca schidigera* extract to the plant extract(s) is in the range of about 1:7 to about 7:1, respectively. By way of further example, in one embodiment, the acidifying composition comprises *Yucca schidigera* extract and a plant extract (other than *Yucca schidigera* extract) and the weight ratio of *Yucca schidigera* extract to the other plant extract(s) is in the range of about 1:6 to about 6:1, respectively. By way of further example, in one embodiment, the acidifying composition comprises *Yucca schidigera* extract and a plant extract (other than *Yucca schidigera* extract) and the weight ratio of *Yucca schidigera* extract to the other plant extract(s) is in the range of about 1:5 to about 5:1, respectively. By way of further example, in one embodiment, the acidifying composition comprises *Yucca schidigera* extract and a plant extract (other than *Yucca schidigera* extract) and the weight ratio of *Yucca schidigera* extract to the other plant extract(s) is in the range of about 1:4 to about 4:1, respectively. By way of further example, in one embodiment, the acidifying composition comprises *Yucca schidigera* extract and a plant extract (other than *Yucca schidigera* extract) and the weight ratio of *Yucca schidigera* extract to the other plant extract(s) is in the range of about 1:3 to about 3:1, respectively. By way of further example, in one embodiment, the acidifying composition comprises *Yucca schidigera* extract and a plant extract (other than *Yucca schidigera* extract) and the weight ratio of *Yucca schidigera* extract to the other plant extract(s) is in the range of about 1:2 to about 2:1, respectively. By way of further example, in one embodiment, the acidifying composition comprises *Yucca schidigera* extract and a plant extract (other than *Yucca schidigera* extract) and the weight ratio of *Yucca schidigera* extract to the other plant extract(s) is in the range of about 1:1, respectively. In each of the foregoing exemplary embodiments, the other plant extract may comprise *Quillaja saponaria* extract.

In one exemplary embodiment, the acidifying composition comprises *Quillaja saponaria* extract and at least one other plant extract (such as another saponin-containing plant extract) and the weight ratio of *Quillaja saponaria* extract to the other plant extract(s) is in the range of about 1:10 to about 10:1, respectively. By way of further example, in one embodiment, the acidifying composition comprises *Quillaja saponaria* extract and a plant extract (other than *Quillaja saponaria* extract) and the weight ratio of *Quillaja saponaria* extract to the other plant extract(s) is in the range of about 1:9 to about 9:1, respectively. By way of further example, in one embodiment, the acidifying composition comprises *Quillaja saponaria* extract and a plant extract (other than *Quillaja saponaria* extract) and the weight ratio of *Quillaja saponaria* extract to the other plant extract(s) is in the range of about 1:8 to about 8:1, respectively. By way of further example, in one embodiment, the acidifying composition comprises *Quillaja saponaria* extract and a plant extract (other than *Quillaja saponaria* extract) and the weight ratio of *Quillaja saponaria* extract to the other plant extract(s) is in the range of about 1:7 to about 7:1, respectively. By way of further example, in one embodiment, the acidifying composition comprises *Quillaja saponaria* extract and a plant extract (other than *Quillaja saponaria* extract) and the weight ratio of *Quillaja saponaria* extract to the other plant extract(s) is in the range of about 1:6 to about 6:1, respectively. By way of further example, in one embodiment, the acidifying composition comprises *Quillaja saponaria* extract and a plant extract (other than *Quillaja saponaria* extract) and the weight ratio of *Quillaja saponaria* extract to the other plant extract(s) is in the range of about 1:5 to about 5:1, respectively. By way of further example, in one embodiment, the acidifying composition comprises *Quillaja saponaria* extract and a plant extract (other than *Quillaja saponaria* extract) and the weight ratio of *Quillaja saponaria* extract to the other plant extract(s) is in the range of about 1:4 to about 4:1, respectively. By way of further example, in one embodiment, the acidifying composition comprises *Quillaja saponaria* extract and a plant extract (other than *Quillaja saponaria* extract) and the weight ratio of *Quillaja saponaria* extract to the other plant extract(s) is in the range of about 1:3 to about 3:1, respectively. By way of further example, in one embodiment, the acidifying composition comprises *Quillaja saponaria* extract and a plant extract (other than *Quillaja saponaria* extract) and the weight ratio of *Yucca schidigera* extract to the other plant extract(s) is in the range of about 1:2 to about 2:1, respectively. By way of further example, in one embodiment, the acidifying composition comprises *Yucca schidigera* extract and a plant extract (other than *Yucca schidigera* extract) and the weight ratio of *Yucca schidigera* extract to the other plant extract(s) is in the range of about 1:1, respectively.

In one exemplary embodiment, the acidifying composition comprises an acid, as described above, and an organic base, as described above, and the molar ratio of acid to organic base (e.g., an amine) is in the range of about 1:10 to about 10:1, respectively. By way of further example, in one embodiment, the acidifying composition comprises acid and organic base, and the molar ratio of acid to organic base is about 1:5 to about 5:1, respectively. By way of further example, in one embodiment, the acidifying composition comprises acid and organic base, and the molar ratio of acid to organic base is about 1:4 to about 4:1, respectively. By way of further example, in one embodiment, the acidifying composition comprises acid and organic base, and the molar ratio of acid to organic base is about 1:3 to about 3:1, respectively. By way of further example, in one embodiment, the acidifying composition comprises acid and organic base, and the molar ratio of acid to organic base is about 1:2 to about 2:1, respectively. By way of further example, in one embodiment, the acidifying composition comprises acid and organic base, and the molar ratio of acid to organic base is about 3:2 to about 2:3, respectively. By way of further example, in one embodiment, the acidifying composition comprises acid and organic base, and the molar ratio of acid to organic base is about 4:3 to about 3:4, respectively. By way of further example, in one embodiment, the acidifying composition comprises acid and organic base, and the molar ratio of acid to organic base is about 5:4 to about 4:5, respectively. By way of further example, in one embodiment, the acidifying composition comprises acid and organic base, and the molar ratio of acid to organic base is about 4:1 to about 1:1, respectively. By way of further example, in one embodiment, the acidifying composition comprises acid and organic base, and the molar ratio of acid to organic base is about 4:1 to about 2:1, respectively. By way of further example, in one embodiment, the acidifying composition comprises acid and organic base, and the molar ratio of acid to organic base is about 4:1 to about 3:1, respectively. In each of the foregoing exemplary embodiments recited in this paragraph, the acid may be, for example, a mineral acid, an organic acid, or a mixture of mineral and/or organic acids as previously described (in the aforementioned ratios). In each of the foregoing exemplary embodiments recited in this paragraph, the acid may comprise, for example, citric acid, glycolic acid, or a combination thereof (in any of the aforementioned amounts and ratios). In addition, in each of the foregoing exemplary embodiments recited in this paragraph, the organic base may be, for example, a surfactant amine, a nitrogen heterocycle, an alkylamine, or a combination thereof as previously described (in the aforementioned ratios). Further, in each of the foregoing exemplary embodiments, the combination of the acid and the organic base may have the capacity to form a soap.

In one exemplary embodiment, the acidifying composition comprises acid, as described above, and an amino acid, as described above, and the molar ratio of acid to amino acid is in the range of about 200:1 to about 1:1, respectively. By way of further example, in one embodiment, the acidifying composition comprises acid and amino acid, and the molar ratio of acid to amino acid is about 100:1 to about 1:1, respectively. By way of further example, in one embodiment, the acidifying composition comprises acid and amino acid, and the molar ratio of acid to amino acid is about 75:1 to about 1:1, respectively. By way of further example, in one embodiment, the acidifying composition comprises acid and amino acid, and the molar ratio of acid to amino acid is about 50:1 to about 1:1, respectively. By way of further example, in one embodiment, the acidifying composition comprises acid and amino acid, and the molar ratio of acid to amino acid is about 200:1 to about 5:1, respectively. By way of further example, in one embodiment, the acidifying composition comprises acid and amino acid, and the molar ratio of acid to amino acid is about 200:1 to about 10:1, respectively. By way of further example, in one embodiment, the acidifying composition comprises acid and amino acid, and the molar ratio of acid to amino acid is about 200:1 to about 25:1, respectively. By way of further example, in one embodiment, the acidifying composition comprises acid and amino acid, and the molar ratio of acid to amino acid is about 200:1 to about 50:1, respectively. By way of further example, in one embodiment, the acidifying composition comprises acid and amino acid, and the molar ratio of acid to amino acid is about 150:1 to about 5:1, respectively. By way of further example, in one embodiment, the acidifying composition comprises acid and amino acid, and the molar ratio of acid to amino acid is about 150:1 to about 10:1, respectively. By way of further example, in one embodiment, the acidifying composition comprises acid and amino acid, and the molar ratio of acid to amino acid is about 150:1 to about 25:1, respectively. By way of further example, in one embodiment, the acidifying composition comprises acid and amino acid, and the molar ratio of acid to amino acid is about 150:1 to about 50:1, respectively. By way of further example, in one embodiment, the acidifying composition comprises acid and amino acid, and the molar ratio of acid to amino acid is about 100:1 to about 5:1, respectively. By way of further example, in one embodiment, the acidifying composition comprises acid and amino acid, and the molar ratio of acid to amino acid is about 100:1 to about 10:1, respectively. By way of further example, in one embodiment, the acidifying composition comprises acid and amino acid, and the molar ratio of acid to amino acid is about 100:1 to about 25:1, respectively. By way of further example, in one embodiment, the acidifying composition comprises acid and amino acid, and the molar ratio of acid to amino acid is about 100:1 to about 50:1, respectively. By way of further example, in one embodiment, the acidifying composition comprises acid and amino acid, and the molar ratio of acid to amino acid is about 75:1 to about 5:1, respectively. By way of further example, in one embodiment, the acidifying composition comprises acid and amino acid, and the molar ratio of acid to amino acid is about 75:1 to about 10:1, respectively. By way of further example, in one embodiment, the acidifying composition comprises acid and amino acid, and the molar ratio of acid to amino acid is about 75:1 to about 25:1, respectively. By way of further example, in one embodiment, the acidifying composition comprises acid and amino acid, and the molar ratio of acid to amino acid is about 75:1 to about 50:1, respectively. In each of the foregoing exemplary embodiments recited in this paragraph, the acid may be a mineral acid, an organic acid, or a mixture of mineral and/or organic acids as previously described (in the aforementioned ratios); for example, the acid may comprise glycolic acid, citric acid or a combination thereof. In addition, in each of the foregoing exemplary embodiments recited in this paragraph, the amino acid may be a naturally encoded amino acid. In each of the foregoing exemplary embodiments recited in this paragraph, the amino acid may be a naturally encoded L-amino acid. In each of the foregoing exemplary embodiments recited in this paragraph, the amino acid may comprise L-glutamine.

In one exemplary embodiment, the acidifying composition comprises an acid, as described above, and an additive, as described above, and the weight ratio of the acid to the additive is in the range of about 1,000:1 to 1:1, respectively wherein the additive is selected from the group consisting of plant growth regulators, plant extracts, surfactants, calcium-containing additives, magnesium-containing additives, jasmonic acid derivatives (e.g., salts, esters, or amides thereof), and carbon-containing additives such as carbohydrates. By way of further example, in one embodiment, the acidifying composition comprises acid and the additive, and the weight ratio of acid to additive is about 900:1 to about 1:1, respectively. By way of further example, in one embodiment, the acidifying composition comprises acid and additive, and the weight ratio of acid to additive is about 800:1 to about 1:1, respectively. By way of further example, in one embodiment, the acidifying composition comprises acid and additive, and the weight ratio of acid to additive is about 700:1 to about 1:1, respectively. By way of further example, in one embodiment, the acidifying composition comprises acid and additive, and the weight ratio of acid to additive is about 600:1 to about 1:1, respectively. By way of further example, in one embodiment, the acidifying composition comprises acid and additive, and the weight ratio of acid to additive is about 750:1 to about 10:1, respectively. By way of further example, in one embodiment, the acidifying composition comprises acid and additive, and the weight ratio of acid to additive is about 600:1 to about 10:1, respectively. By way of further example, in one embodiment, the acidifying composition comprises acid and additive, and the weight ratio of acid to additive is about 500:1 to about 10:1, respectively. By way of further example, in one embodiment, the acidifying composition comprises acid and additive, and the weight ratio of acid to additive is about 750:1 to about 100:1, respectively. By way of further example, in one embodiment, the acidifying composition comprises acid and additive, and the weight ratio of acid to additive is about 600:1 to about 100:1, respectively. By way of further example, in one embodiment, the acidifying composition comprises acid and additive, and the weight ratio of acid to additive is about 500:1 to about 100:1, respectively. By way of further example, in one embodiment, the acidifying composition comprises acid and additive, and the weight ratio of acid to additive is about 750:1 to about 150:1, respectively. By way of further example, in one embodiment, the acidifying composition comprises acid and additive, and the weight ratio of acid to additive is about 600:1 to about 150:1, respectively. By way of further example, in one embodiment, the acidifying composition comprises acid and additive, and the weight ratio of acid to additive is about 500:1 to about 150:1, respectively. By way of further example, in one embodiment, the acidifying composition comprises acid and additive, and the weight ratio of acid to additive is about 450:1 to about 150:1, respectively. By way of further example, in one embodiment, the acidifying composition comprises acid and additive, and the weight ratio of acid to additive is about 750:1 to about 200:1, respectively. By way of further example, in one embodiment, the acidifying composition comprises acid and additive, and the weight ratio of acid to additive is about 600:1 to about 200:1, respectively. By way of further example, in one embodiment, the acidifying composition comprises acid and additive, and the weight ratio of acid to additive is about 500:1 to about 200:1, respectively. By way of further example, in one embodiment, the acidifying composition comprises acid and additive, and the weight ratio of acid to additive is about 400:1 to about 200:1, respectively. By way of further example, in one embodiment, the acidifying composition comprises acid and additive, and the weight ratio of acid to additive is about 750:1 to about 250:1, respectively. By way of further example, in one embodiment, the acidifying composition comprises acid and additive, and the weight ratio of acid to additive is about 750:1 to about 250:1, respectively. By way of further example, in one embodiment, the acidifying composition comprises acid and additive, and the weight ratio of acid to additive is about 600:1 to about 250:1, respectively. By way of further example, in one embodiment, the acidifying composition comprises acid and additive, and the weight ratio of acid to additive is about 500:1 to about 250:1, respectively. By way of further example, in one embodiment, the acidifying composition comprises acid and additive, and the weight ratio of acid to additive is about 450:1 to about 250:1, respectively. By way of further example, in one embodiment, the acidifying composition comprises acid and additive, and the weight ratio of acid to additive is about 400:1 to about 250:1, respectively. By way of further example, in one embodiment, the acidifying composition comprises acid and additive, and the weight ratio of acid to additive is about 350:1 to about 250:1, respectively. In each of the foregoing embodiments identified in this paragraph, the acid may be citric acid, glycolic acid, or a mixture of citric and glycolic acids. In each of the foregoing embodiments identified in this paragraph, the additive may be a plant growth regulator or plant extract. In addition, in each of the foregoing embodiments identified in this paragraph, the additive may be a saponin. In each of the foregoing embodiments identified in this paragraph, the additive may be a saponin derived from a tea plant or a plant in the Sapindaceae (e.g., lychee), Quillajaceae, (e.g., soapbark), Agavaceae (e.g., yuccas) or *Saponaria* (soapwort) families.

The acidifying composition may be prepared by combining the components in a sequence of steps. In a first step, the acid and the base are combined. For example, the acid may be added to the base or vice versa to form an acid-base mixture that, in some embodiments, comprises a soap of one or more of the acid(s) and one or more of the base(s). Advantageously, heat is generated by the combination of the acid and the base which may aid in the dissolution of certain of the other components into the mixture. For example, in one embodiment formation of the acidifying composition comprises in a first step, combining an aqueous solution of glycolic acid with a base (e.g., triethanolamine) to form an acid-base mixture and thereafter adding solid citric acid to the acid-base mixture; in this embodiment, the heat generated by combining the glycolic acid and base aids in the dissolution of the solid citric acid. In those embodiments in which the acidifying composition additionally comprises at least one amino acid, the amino acid(s) may be added to the acid-base mixture as the free amino acid or as a salt or hydrate thereof. Similarly, in those embodiments in which the acidifying composition comprises at least one additive, the additive(s) may also be added to the acid-base mixture. In those embodiments in which the acidifying composition comprises at least one amino acid and at least one additive, the amino acid(s) and the additive (s) may be added to the acid-base mixture simultaneously or in either order.

Advantageously, the acidifying composition may be prepared as a concentrate which may then be conveniently stored or transported, and then diluted with irrigation or industrial water prior to use. For example, in some embodiments, the concentrate may comprise the acid in a concentration in a range of about 0.125-2.5M, base in the range of 0.05-1M, amino acid in the range of 0.0025-0.05 M and additive in the amount of about 0.05-1 g/l. By way of further example, in some embodiments, the concentrate may comprise the acid in a concentration in a range of about 0.5-2.5M, base in the range of 0.1-1M, amino acid in the range of 0.01-0.05 M and additive in the amount of about 0.1-1 g/l. By way of further example, in some embodiments, the concentrate may comprise the acid in a concentration in a range of about 0.5-2M, base in the range of 0.1-0.75M, amino acid in the range of 0.005-0.0375 M and additive in the amount of about 0.1-0.75 g/l. By way of further example, in some embodiments, the concentrate may comprise the acid in a concentration in a range of about 1-1.5M, base in the range of 0.2-0.75M, amino acid in the range of 0.01-0.0375 M and additive in the amount of about 0.2-0.75 g/l. In each of the foregoing exemplary embodiments, the additive may comprise a plant extract such as yarrow extract or a saponin-containing extract such as a *yucca* extract. Additionally, the acidifying composition may independently comprise two or more acids, two or more bases, two or more amino acids, and/or two or more natural surfactants, in the ratios previously described elsewhere herein. In each of the foregoing exemplary embodiments, the acidifying composition may independently comprise two or more acids, two or more bases, two or more amino acids, and/or two or more plant extracts, in the ratios previously described elsewhere herein.

As previously noted, the acidifying composition may be used in the form of a solid, semi-solid or liquid. When used, for example, in agricultural applications the acidifying composition may be combined with diluent (solid or liquid) to facilitate application at the desired rate. In one such application, a concentrate of the acidifying composition is combined with a solid diluent such as a micronutrient fertilizer, a macronutrient fertilizer, a mineral or other particulate matter and then broadcast onto the soil. In another such application, or other composition a concentrate of the acidifying composition is combined with a liquid diluent such as a micronutrient fertilizer, a macronutrient fertilizer, a mineral or other liquid composition such as irrigation water and then applied to the soil. In each of the foregoing embodiments, the dilution rate (i.e., the amount of the concentrate relative to the amount of diluent) and the application rate (amount of the combination) to the soil is a matter within the discretion of the person applying the acidifying composition, consistent with the aforementioned application rates for the concentrate.

In certain embodiments, the irrigation composition may be applied to a soil or crop, as described above, in various concentrations, as described above, per acre, as described above, per unit time. For example, in one embodiment, the irrigation composition may be applied once a year. By way of further example, in one embodiment, the irrigation composition may be applied once a month. By way of further example, in one embodiment, the irrigation composition may be applied once a week. By way of further example, in one embodiment, the irrigation composition may be applied semi-monthly or even more frequently.

Application of the acidifying composition has been found to increase the microflora and microfauna populations, as well as the mesofauna populations in soil to which the acidifying composition is applied. Exemplary mesofauna organisms in the soil include earthworms and nematodes, and microflora and microfauna include bacteria, fungi, and mycorrhizae. As such, the application of the acidifying composition to the soil may provide benefits associated with enhancing seed germination and improve soil conditions for farming, landscaping, and the like.

In certain embodiments, application of the acidifying composition to the soil improves soil quality. Exemplary soil quality attributes include aeration, percolation, drainage, and the like.

In certain embodiments, the acidifying composition may be used in conjunction with an agricultural crops. In one such exemplary embodiment, agricultural crops may be selected from plantains, yams, sorghum, sweet potatoes, soybeans, cassava, potatoes, corn, alfalfa, wheat, and rice. Alternatively, the acidifying composition may be used in conjunction with recreational areas, residential landscapes, commercial landscapes, golf courses, lawns, cemeteries, parks, and the like. The soil to which the acidifying composition may be applied thus includes any soil suitable for cultivation of plants. Exemplary soils include sandy soils, silty soils, clay soils, peaty soils, saline soils, sodic soils, agriculturally compromised soils (e.g., toxic, sodic, alkaline, and the like), chalky soils, loamy soils, mulch, topsoil, hydroponics, gravel, and compost.

In general, another aspect of the instant disclosure is related to an irrigation composition. An exemplary irrigation composition includes the acidifying composition described herein—in at least one of the acidifying composition embodiments described herein—and industrial water. Without being bound to any particular theory, since industrial water may carry associated risks related to the pre-existing composition of the industrial water, treatment with the acidifying composition may improve industrial water quality before administering the industrial water to the soil. More specifically, some industrial water contains excessive levels of impurities (e.g., sodium, carbonate, and bicarbonate ions—inter alia) that may pose a significant stress on soils or crops, and the like. Treatment of the industrial water with the acidifying composition described herein may ameliorate industrial water impurities.

Referring again to FIG. 2, the acidifying composition may be prepared as a concentrate that is then diluted in water (irrigation or industrial) prior to application to the soil or other use. Exemplary application techniques include spraying, mechanized spraying, and traditional spraying. In one such exemplary embodiment, aqueous spraying includes handheld sprayers, boom sprays, sprinklers (e.g., center pivots, waterwheels, circle irrigation systems, etc.), and water hoses. In another such exemplary embodiment, mechanized aqueous sprayers include tractors equipped with a dispersing mechanism (e.g., a boom spray) and/or airplanes equipped with a dispersing mechanism (e.g., crop dusting). In yet another exemplary embodiment, traditional spraying includes flood (furrow), surface, or border. By way of further example, traditional spraying includes drip. By way of further example, traditional spraying includes gravity. By way of further example, traditional spraying includes rotation. By way of further example, traditional spraying includes subirrigation. By way of further example, traditional spraying includes traveling gun. By way of further example, traditional spraying includes supplemental irrigation (i.e., before or after rainfall). By way of further example, traditional spraying includes rain. In another embodiment, dispersing of the aqueous concentrate 110 may include dispersing over a soil 130, with or without a plant 120.

Referring again to FIG. 3, in one embodiment, the application of the acidifying composition may include dispersing the acidifying composition 110 (e.g., as a solid, semi-solid, etc.) over a soil 130 either before or concurrently with industrial water 150. Exemplary solid dispersing techniques include methods similar to the application of fertilizers. In one such exemplary embodiment, the application of the acidifying composition may include using a wheelbarrow and shovel. By way of further example, the application of the acidifying composition may include using a spreader. By way of further example, the application of the acidifying composition may include using a seeder. By way of further example, the application of the acidifying composition may include using a tractor equipped with a spreader/seeder. By way of further example, the application of the acidifying composition may include using an airplane equipped with a spreader/seeder. In other non-limiting embodiments, other solid dispersal mechanisms known in the art will be applicable.

In certain embodiments, a treatment includes liberating polyvalent cations from their corresponding carbonates, phosphates, or other insoluble species. Exemplary polyvalent cations that may be liberated include divalent cations. In one such exemplary embodiment, the treatment liberates divalent cations comprising calcium ($Ca^{2+}$) and/or magnesium ($Mg^{2+}$) cations from their corresponding carbonates and/or phosphates.

In certain embodiments, a treatment includes reducing monovalent cations from soil or irrigation water. Exemplary monovalent cations include sodium ($Na^+$) and potassium ($K^+$). In one such exemplary embodiment, the treatment liberates sodium ($Na^+$) and/or potassium ($K^+$) cations from soil or irrigation water.

In general, methods for the preparation of the irrigation composition include combining industrial water and the acidifying composition in a suitable receptacle. A suitable receptacle may include any container (e.g., a bucket, or a glass-lined reactor) that does not react with organic acids, amines, amino acids, attractants, or any combination thereof. Following the addition of industrial water, the acidifying composition as described herein may be added.

In certain embodiments, methods for the preparation of the irrigation composition include adding industrial water to a suitable receptacle. A suitable receptacle may include any container (e.g., a bucket, or a glass-lined reactor) that does not react with organic acids, amines, amino acids, attractants, or any combination thereof. Then, addition of the amine, followed by a first C1-C7 organic acid to generate a first mixture. One of skill in the art will appreciate the possibility of an exotherm in generating the first mixture. Then, addition of the second C1-C7 organic acid generates a second mixture. Optionally, in one embodiment, the amino acid is added next, followed by the additive such as a plant extract. Optionally, in another embodiment, the plant extract is added next, followed by the amino acid.

The application rate of the acidifying composition for agricultural uses will, at least in part, be a function of soil and climactic conditions, as well as the identity of the crop or vegetation being supported. In one exemplary embodiment, the acidifying composition is applied to the soil in an amount sufficient to provide at least about 0.25 moles but less than 25 moles of acid per acre per month and at least about 0.1 moles but less than 10 moles of base per acre per month. In those embodiments in which the acidifying composition additionally comprises an amino acid, the acidifying composition is applied to the soil in an amount sufficient to provide at least about 0.005 moles but not more than about 0.5 moles of amino acid per acre per month. In those embodiments in which the acidifying composition additionally comprises an additive such as a plant extract, the acidifying composition is applied to the soil in an amount sufficient to provide at least about 0.1 grams but not more than about 10 gram of additive per acre per month. In each of these embodiments, the acidifying composition may be applied as a solid or an aqueous liquid, alone or with other additives or diluents as described herein.

In one exemplary embodiment, the acidifying composition is applied to the soil in an amount sufficient to provide at least about 0.5 moles but less than 20 moles of acid per acre per month and at least about 0.2 moles but less than 7.5 moles of base per acre per month. In those embodiments in which the acidifying composition additionally comprises an amino acid, the acidifying composition is applied to the soil in an amount sufficient to provide at least about 0.01 moles but not more than about 0.4 moles of amino acid per acre per month. In those embodiments in which the acidifying composition additionally comprises an additive such as a plant extract, the acidifying composition is applied to the soil in an amount sufficient to provide at least about 0.2 grams but not more than about 8 gram of additive per acre per month. In each of these embodiments, the acidifying composition may be applied as a solid or an aqueous liquid, alone or with other additives or diluents as described herein.

In one exemplary embodiment, the acidifying composition is applied to the soil in an amount sufficient to provide at least about 0.25 mole but less than 20 moles of acid per acre per month and at least about 0.2 moles but less than 5 mole of base per acre per month. In those embodiments in which the acidifying composition additionally comprises an amino acid, the acidifying composition is applied to the soil in an amount sufficient to provide at least about 0.0025 moles but not more than about 0.25 moles of amino acid per acre per month. In those embodiments in which the acidifying composition additionally comprises an additive such as a plant extract, the acidifying composition is applied to the soil in an amount sufficient to provide at least about 0.1 grams but not more than about 10 gram of additive per acre per month. In each of these embodiments, the acidifying composition may be applied as a solid or an aqueous liquid, alone or with other additives or diluents as described herein.

In one exemplary embodiment, the acidifying composition is applied to the soil in an amount sufficient to provide at least about 0.25 mole but less than 10 moles of acid per acre per month and at least about 0.2 moles but less than 2.5 mole of base per acre per month. In those embodiments in which the acidifying composition additionally comprises an amino acid, the acidifying composition is applied to the soil in an amount sufficient to provide at least about 0.0025 moles but not more than about 0.125 moles of amino acid per acre per month. In those embodiments in which the acidifying composition additionally comprises an additive such as a plant extract, the acidifying composition is applied to the soil in an amount sufficient to provide at least about 0.1 grams but not more than about 5 gram of additive per acre per month. In each of these embodiments, the acidifying composition may be applied as a solid or an aqueous liquid, alone or with other additives or diluents as described herein.

In one exemplary embodiment, the acidifying composition is applied to the soil in an amount sufficient to provide at least about 0.5 mole but less than 5 moles of acid per acre per month and at least about 0.25 moles but less than 2 moles of base per acre per month. In those embodiments in which the acidifying composition additionally comprises an amino acid, the acidifying composition is applied to the soil in an amount sufficient to provide at least about 0.005 moles but not more than about 0.1 moles of amino acid per acre per month. In those embodiments in which the acidifying composition additionally comprises an additive such as a plant extract, the acidifying composition is applied to the soil in an amount sufficient to provide at least about 0.1 grams but not more than about 2.5 gram of additive per acre per month. In each of these embodiments, the acidifying composition may be applied as a solid or an aqueous liquid, alone or with other additives or diluents as described herein.

In one exemplary embodiment, the acidifying composition is applied to the soil in an amount sufficient to provide at least about 0.75 mole but less than 3 moles of acid per acre per month and at least about 0.35 moles but less than 1.5 mole of base per acre per month. In those embodiments in which the acidifying composition additionally comprises an amino acid, the acidifying composition is applied to the soil in an amount sufficient to provide at least about 0.0075 moles but not more than about 0.075 moles of amino acid per acre per month. In those embodiments in which the acidifying composition additionally comprises an additive such as a plant extract, the acidifying composition is applied to the soil in an amount sufficient to provide at least about 0.2 grams but not more than about 1.5 gram of additive per acre per month. In each of these embodiments, the acidifying composition may be applied as a solid or an aqueous liquid, alone or with other additives or diluents as described herein.

In one exemplary embodiment, the acidifying composition is applied to the soil in an amount sufficient to provide at least about 1 mole but less than 2.5 moles of acid per acre per month and at least about 0.25 moles but less than 1 mole of base per acre per month. In those embodiments in which the acidifying composition additionally comprises an amino acid, the acidifying composition is applied to the soil in an amount sufficient to provide at least about 0.01 moles but not more than about 0.05 moles of amino acid per acre per month. In those embodiments in which the acidifying composition additionally comprises an additive such as a plant extract, the acidifying composition is applied to the soil in an amount sufficient to provide at least about 0.25 grams but not more than about 1 gram of additive per acre per month. In each of these embodiments, the acidifying composition may be applied as a solid or an aqueous liquid, alone or with other additives or diluents as described herein.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

EXAMPLES

The following examples further illustrate the practice of the inventive subject matter. As will be appreciated by those of skill in the art, common large-scale equipment may be used. For example, a cavitation pump system, among other mixing systems, without limitation, may be employed for the addition and mixing of reagents.

Example 1

Preparation of Acidifying Composition

In a 1200 gallon stainless steel reactor was added water (approximately 720 gallons, at ambient temperature, at 180 gallons per minute) generating vortex stirring. Triethanolamine (approximately 510 lbs., 1535 mol) was preheated to 90 F and added via pressure at 5 lbs. per minute, and the clear, colorless solution was stirred as a vortex at ambient temperature. Glycolic acid (approximately 815 lbs., 3402 mol) was added as a 70% aqueous mixture via pressure at 5 lbs. per minute, providing a clear, colorless solution. NOTE: Exothermic reaction! The resulting exothermic solution was stirred for 20 min. with the exotherm reaching between 20-30 F above ambient temperature. At the exothermic temperature and with vortex stirring, citric acid (approximately 272 lbs., 635 mol) was added portion wise as a solid in approximately 10 lb. portions, resulting in a clear, colorless solution. This mixture was stirred until the exotherm cooled to ambient temperature before L-Glutamine (approximately 22 lbs., 68 mol) was added as a fine powder at ambient temperature, portion wise in approximately 2 lb. portions, resulting in a clear, colorless solution. *Yucca* Schidigera extract (approximately 3 lbs.) was then added as a mixture in water in a single portion at ambient temperature. Slight foaming occurred at the surface of the resulting mixture, and after stirring for 30 min. yielded 870 gallons of a honey-colored, homogenous parent mixture.

Example 2

Changes in Soil Structure

Figure 6A:
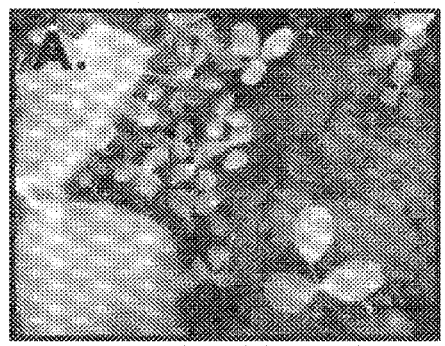
FIGS. 6A and 6B show photographs of regions of a field treated with an acidifying composition.
Figure 6B:
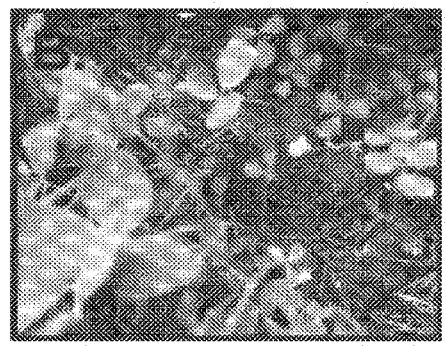
Figure 6C:
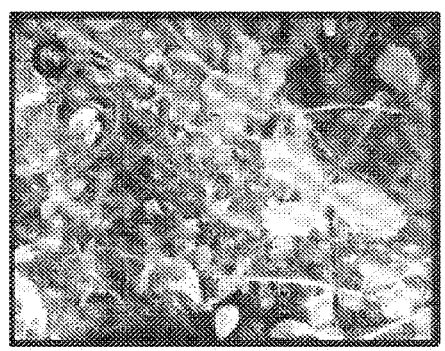
FIGS. 6C and 6D show photographs of regions of a field that were not treated with an acidifying composition.
Figure 6D:
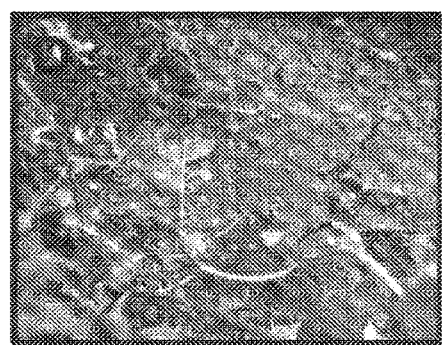

Two adjacent fields with the same soil type, planted with alfalfa, were irrigated monthly using either water, or water amended with the acidifying composition as prepared in Example 1 (0.25 gal/ac/mo). The fields were observed following 8 months of treatment. Photographs typical of those observations are shown in FIGS. 6A-6D. There were apparent changes in soil permeability to water, plant health, and soil biology in fields to which the product was applied. FIGS. 6A-6D show photographs taken in two adjacent fields (Fields P and W). FIGS. 6A and 6B show typical regions of Field P, which had been treated with product for about 8 months. Note the preponderance of worm castings on the surface, the moist soil, and the healthy leaves of the alfalfa plants. FIGS. 6C and 6D are from Field W, which received no product treatment. In these cases, note the lack of worm castings, the cracked soil, and the plants showing frost damage. In addition, algae growth is apparent on the surface, indicating poor water permeability that leads to pooling. All of these properties, improved soil permeability, improved plant health, and improved soil biology, are typically associated with application of the product.

Example 3

Figure 7A:
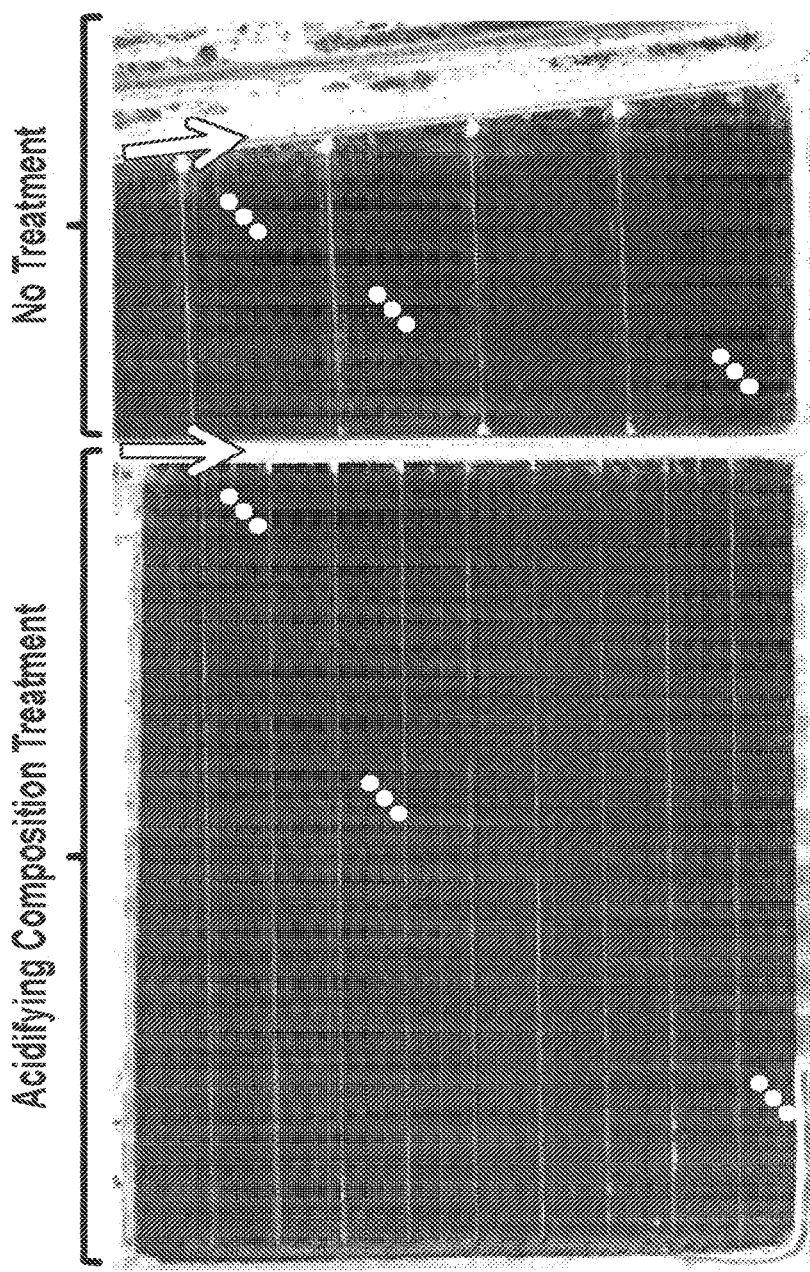
FIG. 7A shows photographs of a comparison of the treated and untreated fields.
Figure 7B:
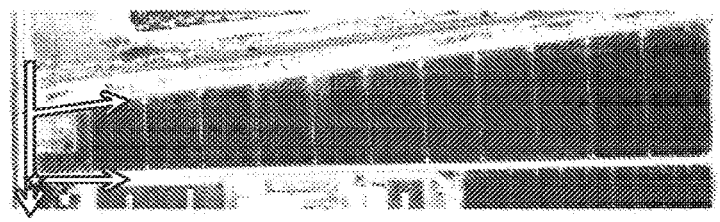
FIG. 7B shows a flow of a water supply from a primary canal to terminal canals supplying each field.

Soil Texture and Earthworm Count Differences Between Treated and Untreated Soil Planted with Alfalfa To quantify the effect of treatment with the composition on the number of earthworms present in agricultural fields, a study was performed comparing earthworm populations in paired fields treated with the acidying composition in water vs. untreated fields. Three sets of paired, four year-old alfalfa fields on a dairy farm in Buckeye, Ariz. were used, as shown in FIG. 7. One member of each pair was treated with the acidifying composition as prepared in Example 1 (1 quart/ac/mo) for approximately 2 years and the other had never been treated. Each pair was separated by a dirt road, with the untreated fields (top of FIG. 7A) on the north side of the road and the treated fields (bottom of FIG. 7A) on the south side, and all fields received irrigation water from the Colorado River, with the untreated fields being upstream of the treated fields on the irrigation system. The composition was added to the irrigation water as it entered the terminal irrigation canal from which the treated fields were watered. In FIGS. 7A and 7B, the arrows show the location and direction of flow in irrigation canals supplying water to each field, with FIG. 7B showing the water supply from a primary canal to terminal canals supplying each field, and the star indicating the location where the acidifying composition was added to irrigation water in the treated fields.

A difference was initially noted in the soil texture of the two fields. The untreated fields were very hard and cracked, and a ¼ inch rod could only be forced about 2 inches in to the ground. The treated fields were much less hard and were not cracked, and the ¼ inch rod could be forced about 2.5 feet into the ground. In addition, the untreated fields had higher weed populations than the treated fields.

Earthworm populations were estimated using a standard protocol (A. Gunn, The use of mustard to estimate earthworm populations. 1992. *Pedobiologia*, 36: 65-67). Three sites in each field were sampled, for a total of nine sites (the dots in each field in FIG. 7A show the sampling locations). At each sampling station, a wooden frame with internal dimensions of 33 cm×33 cm was placed on the ground. Alfalfa (aerial portions) and debris were removed from within the frame to provide a clear view of the soil surface, and the frame was forced in to the ground to provide a barrier to draining of the liquid from within the frame. Forty grams of dried, ground mustard seed (McCormick's) were added to 3 liters of water and the bottle was shaken to mix thoroughly. The liquid (3 L) was poured on to the soil surface within the frame and added slowly (over 5 minutes) and allowed to soak in. The soil surface within the frame was observed for 20 minutes at each site, and worms emerging from the soil within the frame were collected and preserved in 70% isopropyl alcohol. Worms emerging outside of the frame were not counted.

Earthworms were separated from soil and debris and counted, as shown in Table 1 below. This data revealed there was a significant presence of earthworms in soils treated with the composition vs. fields not receiving treatment. This effect is generally seen only on fields irrigated with canal water, as opposed to fields irrigated with well water or class II water from dairy operations. We hypothesize this is due to the presence of earthworm cysts in the river water that feeds the canals, and that the soil texture changes initiated by the acidifying composition provide an improved habitat for earthworms. The earthworms, in turn, improve soil structure and nutrient release as they multiply.

TABLE 1

Number of earthworms identified at each sampling site in the Calcine-treated vs. untreated alfalfa fields.

| | Earthworm Counts - Per Square Meter Field No. | | | | | | | | | |
|---|---|---|---|---|---|---|---|---|---|---|
| | 1 | | | 2 | | | 3 | | | Sample |
| | Sample Site | | | | | | | | | Standard |
| | A | B | C | A | B | C | A | B | C | Average | Deviation |
| Un-treated | 1 | 0 | 0 | 0 | 0 | 0 | 0 | 0 | 0 | 0.1 | 0.3 |
| Treated | 117 | 135 | 144 | 144 | 94 | 162 | 72 | 117 | 126 | 123.4 | 27.5 |

Example 4

Earthworm Migration—Acidifying Composition-Treated and Untreated Soil

Saline soil collected from an agricultural field in Arizona was passed through a 2 mm sieve and treated (1 L) with either the acidifying composition prepared according to Example 1, at a rate of 1 gal per acre in water, or with simply water. The treatment was allowed to flow through the soil, which was drained to field capacity and allowed to dry. The soil was sieved again to ensure uniformity. The acidifying composition-treated and water-treated soils were placed side-by-side in a pan (approx. 9"×11"×3"). Commercially purchased worms and their bedding were placed on the surface of the pan at the interface of the two treatments. The pan was loosely covered, incubated at 50 F misted daily with DI water. After 72 hours, the worms were collected and counted (see, e.g., Table 2 below). Data revealed that, depending on maturity, earthworms in a laboratory setting chose soils treated with the composition between 1.8 and 7.7 times more often that soils treated only with water.

TABLE 2

Earthworm counts after 72 hours

| Treatment | | Location | No. of Worms | Total |
|---|---|---|---|---|
| Water | Eisenia fetida juvenile | Surface | 2 | 7 |
| | | In Soil | 5 | |
| | Eisenia fetida adult | Surface | 0 | 21 |
| | | In Soil | 21 | |
| Composition | Eisenia fetida juvenile | Surface | 1 | 54 |
| | | In Soil | 53 (1 deceased) | |
| | Eisenia fetida adult | Surface | 0 | 38 |
| | | In Soil | 38 | |

Example 5

Earthworm Counts—Treated and Untreated Soil Planted with Corn

To quantify the effect of treatment with the acidifying composition on the number of earthworms present in agricultural fields, a study was performed comparing earthworm populations in a pair of cornfields, one treated with the acidifying composition prepared according to Example 1 and amended to irrigation water (1 qt/ac/mo), and one receiving untreated irrigation water, which had been in alfalfa for three previous years. These fields had been tilled and mounded prior to planting of corn, which was at approximately stage V6-V8 in both fields at the time of survey. As earthworms in cornfields may be primarily associated with the plant roots, the earthworms were surveyed by digging up the soil associated with 10 plants (about a 8×8×8 inch section) and counting the earthworms associated with each plant, as shown in Table 3 below. The data revealed that earthworms were associated with corn roots in greater numbers in the areas receiving the acidifying composition-amended water, than those receiving unamended water.

TABLE 3

Numbers of earthworms associated with corn plant roots in fields receiving unamended irrigation water and irrigation water amended with the acidifying composition.

| Treatment | # of plants assessed | Total # Worms Found | Av. # worms per plant |
|---|---|---|---|
| Water Only | 10 | 3 | 0.3 |
| Composition-amended water | 10 | 42 | 4.2 |

Example 6

Effects on Soil Chemistry Following Treatment with Acidifying Composition

The effect of the composition on agricultural fields was evaluated by applying the acidifying composition prepared according to Example 1 (1 qt/ac/mo) to three adjacent fields with the same soil type (Test Fields 1, 2 and 3; Table CE29) on a dairy at a rate of 1 gallon per acre (2 quarts per acre in the first treatment, one quart per acre in each of two subsequent treatments, one treatment per month). A fourth adjacent field (UTC) served as an untreated control. During this time, the fields were planted with sorghum. Prior to the next crop, the soil was tested to compare the fields, as shown in Table 4 below. The data reveal that the three treated fields had significantly higher electrical conductivity, indicating a higher solubility of ions in the soil. Calcium concentrations remained relatively high and stable. But soluble sodium approximately doubled, as did the exchangeable sodium percentage (ESP). Intriguingly, both nitrate and phosphate concentrations were significantly elevated in the treated fields, suggesting that these were liberated by the treatment. The cation exchange capacity (CEC) of the soils remained stable.

TABLE 4

Soil results on fields treated with the acidifying composition in water vs. an untreated control

| Tests | UTC | Test Field 1 | Test Field 2 | Test Field 3 |
|---|---|---|---|---|
| Crop1 | Sorghum | Sorghum | Sorghum | Sorghum |
| Crop2 | Corn | Corn | Corn | Corn |
| Treated with the composition | No | Yes | Yes | Yes |
| pH | 8.3 | 8.2 | 8 | 8.1 |
| Electrical Conductivity | 0.44 | 1.1 | 1.2 | 1.2 |
| Calcium, Ca (ppm) | 2000 | 2100 | 1900 | 2100 |
| Sodium, Na (ppm) | 110 | 260 | 230 | 230 |
| Nitrate-N NO3—N (ppm) | 4.8 | 24 | 45 | 41 |
| Sulfate-S SO4—S (ppm) | 21 | 66 | 72 | 75 |
| Free Lime, FL | High | High | High | High |
| ESP (%) | 3.6 | 8.4 | 8 | 7.3 |
| CEC (meq/100 g) | 13.2 | 13.2 | 12.6 | 13.6 |

Example 7

Effects on Crop Nutrient Levels

The acidifying composition prepared according to Example 1 in water (0.25 gal/ac/mo) was applied to an agricultural field in Arizona growing alfalfa. An adjacent field, also growing alfalfa, served as an untreated control and received only water. Alfalfa was harvested and forage tests conducted, as shown in Table 5 below. The concentrations of phosphorus, potassium, sulfur and some other minerals remained high in the alfalfa, although these elements were not being added to the field during this study. This indicates that the acidifying composition was liberating these elements from their insoluble state on soil particles, and they were being removed from the field through a combination of leaching and harvest of the crop. In comparison, the control field continued to produce alfalfa with relatively high sodium and chloride levels, indicating that the leaching component of removal was not as active in this field.

TABLE 5

Effects of irrigating with water amended with the composition on alfalfa plant tissue on an Arizona farm. Forage quality data was collected from the field receiving water amended with the acidifying composition and an adjacent field receiving unamended water.

| | Treatment Field Baseline | Following 12 months of Treatment | Control Field, after 12 months of no treatment |
|---|---|---|---|
| Crude Protein | 23.70% | 28.11% | 24.87% |
| Nitrogen | 3.79% | 4.50% | 3.98% |
| Nitrogen/Sulfur Ratio | 11.15 | 13.63 | 12.44 |
| ADF Insoluble Protein | 1.96% | 2.07% | 1.83% |
| Protein Solubility | 43.77% | 44.85% | 44.86% |
| Sugar ESC | 6.10% | 5.67% | 6.80% |
| ADF | 22.98% | 21.32% | 22.78% |
| NDF | 30.81% | 28.48% | 30.52% |
| dNDF | 12.54% | 11.22% | 12.10% |
| NDFD 24 (1 mm) | 40.70% | 39.39% | 39.65% |
| Fat (EE) | 1.90% | 2.11% | 1.96% |
| Ash | 11.76% | 11.89% | 11.76% |
| Lignin (Sulfuric Acid) | 5.53% | 6.02% | 5.99% |
| Calcium | 1.27% | 1.46% | 1.26% |
| Phosphorus | 0.33% | 0.39% | 0.38% |

TABLE 5-continued

Effects of irrigating with water amended with the composition on alfalfa plant tissue on an Arizona farm. Forage quality data was collected from the field receiving water amended with the acidifying composition and an adjacent field receiving unamended water.

|  | Treatment Field Baseline | Following 12 months of Treatment | Control Field, after 12 months of no treatment |
| --- | --- | --- | --- |
| Magnesium | 0.34% | 0.33% | 0.34% |
| Potassium | 3.36% | 3.12% | 3.10% |
| Sulfur | 0.34% | 0.33% | 0.32% |
| Sodium | 0.25% | 0.19% | 0.26% |
| Chloride | 1.31% | 0.70% | 1.08% |
| TDN | 53.96% | 61.41% | 60.82% |
| NFC | 31.83% | 29.41% | 30.89% |
| NEL (Mcal/100 lb) | 62.27 | 67.80 | 65.54 |
| DCAD (meq/100 g) | 38.95 | 40.99 | 31.53 |

To understand how the soil chemistry was changing in the treated field (Field P), soil samples were taken five months apart, as shown in Table 6 below. The first sample was taken and analyzed after 6 consecutive months of treatment, and the second sample was taken and analyzed after 11 consecutive months of treatment. These samples show that sodium and chloride, which are normally tightly bound to clay particles, are being depleted approximately as quickly as potassium and phosphorus. This is despite the fact that calcium remains high. Thus, all of these elements are available to the plant, are taken up, and are being removed from the field with the harvest and through leaching.

TABLE 6

Soil chemistry changes in field P treated with acidifying composition

| Tests | Units | Field P | Field P |
| --- | --- | --- | --- |
| Field Sample Time | — | After Month 6 | After Month 11 |
| pH | SU | 8.3 | 8.2 |
| Phosphorus, P1 | ppm | 24 | 18 |
| Phosphorus, P2 | ppm | 163 | 135 |
| Potassium | ppm | 364 | 237 |
| Calcium, Ca | ppm | 3175 | 2919 |
| Sodium, Na | ppm | 775 | 564 |
| Sulfur, S | ppm | 77 | 62 |

Example 8

Demonstration of Increased Water Use Efficiency and Increased Yields

The effect of the acidifying composition prepared according to Example 1 on water use efficiency was observed on irrigated agricultural fields in growing alfalfa in Arizona. The amount (acre feet) of irrigation water used per month was tracked over a four month period. The initial irrigation was done with unamended water. Subsequent irrigations were done with water amended with the composition (0.25 GPA). The yield (dry matter, DM) of the harvested alfalfa was tracked, as shown in Table 7 below. The data reveal that the amount of water used to irrigate the crop decreased monthly after acidifying composition-amended watering commenced. After four months of monthly treatment, a 63% reduction in water use was seen. This coincided with a 31% increase in dry matter yield. During the observation period, it was noted that the hard caliche on top of the soil disappeared after application of the composition-treated water, and the soil became both more permeable and more able to retain water.

TABLE 7

Demonstration of increase of water use efficiency (decreased water demand) and increased yield for alfalfa grown using irrigation water amended with the acidifying composition

| | Gate Number | Hours | Inches per hour | Acre Feet | Cost per acre foot | Cost | Yield/DM |
| --- | --- | --- | --- | --- | --- | --- | --- |
| Initial Irrigation | 27 | 49 | 500 | 50.63 | $18.00 | $911.34 | 0.7 |
| Month 1 | 27 | 72 | 300 | 44.64 | $18.00 | $803.52 | 0.75 |
| Month 2 | 27 | 73 | 250 | 37.72 | $18.00 | $678.96 | 0.9 |
| Month 3 | 27 | 73 | 240 | 34 | $18.00 | $678.96 | 0.92 |
| Month 4 | 27 | 73 | 230 | 32 | $18.00 | $678.96 | 0.92 |

Example 9

Water Comparison—by Composition Dose

Saline soil was treated with the acidifying composition prepared according to Example 1 in water versus solely water (i.e., untreated control (UTC)), and tested for leaching of salts from the soil. Clear, plastic cylinders (1⅞" diameter, 14" in length) were filled with uniformly packed saline soil collected from an agricultural field in Arizona (1.1 lb. soil per cylinder or 12" of soil) and then independently treated with water (100 mL) to fully wet the soil. Preliminary trials demonstrated that 100 mL of water was the approximate capacity of 12 inches of soil in cylinders. The acidifying composition was diluted to 0.25, 0.5, and 1 gallon per acre equivalents in water, and the acidifying composition in water (20 mL) was applied to the surface of the soil. Using removable rubber plugs, soils were kept moist for 28 days. Then water (200 mL) was added to each cylinder and the filtrates (leachates) were collected and analyzed for dissolved nutrients or salts. Data was analyzed at Motzz Laboratory, Phoenix, Ariz. and is shown in Table 8 below (units used in the table include gallon per acre equivalent (GPA); milliequivalents (Meq); deciSiemens per meter (dS/m); electrical conductivity of water (ECw); sodium adsorption ratio (SAR)). The data revealed that the samples treated with the acidifying composition retained more water and increased removal of salts through leaching.

TABLE 8

Water volume and composition of leachates from soil treated with
water or with the acidifying composition at various concentrations

| | Treatments (3 Replications Combined) Metric | | | | | | | |
|---|---|---|---|---|---|---|---|---|
| | UTC | | ¼ GPA | | ½ GPA | | 1 GPA | |
| | Leachate Volume* | | | | | | | |
| | 198 mL | | 123 mL | | 101 mL | | 124 mL | |
| | ppm | Meq/L | ppm | Meq/L | ppm | Meq/L | ppm | Meq/L |
| Cations | | | | | | | | |
| Sodium | 120 | 5.22 | 152 | 6.61 | 158 | 6.85 | 138 | 5.99 |
| Calcium | 251 | 12.56 | 347 | 17.34 | 390 | 19.51 | 316 | 15.80 |
| Magnesium | 20 | 1.65 | 27 | 2.27 | 30 | 2.52 | 25 | 2.06 |
| Potassium | 55 | 1.41 | 71 | 1.83 | 81 | 2.08 | 66 | 1.70 |
| Anions | | | | | | | | |
| Carbonate | 0 | 0.00 | 0 | 0.00 | 0 | 0.00 | 0 | 0.00 |
| Bicarbonate | 181 | 2.96 | 180 | 2.95 | 180 | 2.95 | 217 | 3.56 |
| Chloride | 97 | 2.74 | 103 | 2.89 | 114 | 3.22 | 103 | 2.90 |
| Sulfate-S | 86 | 5.40 | 98 | 6.09 | 110 | 6.95 | 93 | 5.81 |
| Nitrate-N | 150 | 9.80 | 260 | 17.48 | 290 | 19.58 | 220 | 14.63 |
| Phosphate | 0.31 | 0.01 | 0.14 | 0.01 | 0.10 | 0.00 | 0.14 | 0.01 |
| Boron | 0.14 | 0.04 | 0.15 | 0.04 | 0.16 | 0.04 | 0.15 | 0.03-4 |
| Total Salts | 960 | 41.79 | 1,200 | 57.52 | 1,400 | 63.47 | 1,200 | 52.50 |
| pH | | 7.4 | | 7.4 | | 7.0 | | 7.1 |
| ECw** | | 2.1 dS/m | | 2.2 dS/m | | 3.2 dS/m | | 2.6 dS/m |
| SAR*** | | 1.96 | | 2.11 | | 2.06 | | 2.00 |

*Milliliters of leachate from 3 cylinders, averaged
**Approximately 640 ppm per dS/m.
***Describes the relationship of sodium to calcium/magnesium.

What is claimed is:

1. A method for promoting an increase in a population of earthworms in soil comprising applying an acidifying composition to the soil, wherein the acidifying composition comprises water, two organic acids, a C2-C20 N-hydroxyalkylamine, an amino acid and a plant extract additive, wherein the two organic acid are in a molar ratio of about 1:10 to 10:1, wherein the acidifying composition is in an amount sufficient to provide about 0.25 to about 25 moles acid per acre of the soil per month, and wherein the two organic acids comprise citric acid and glycolic acid.

2. The method of claim 1, wherein the plant extract additive is *yucca schidigera* extract.

3. The method of claim 1, wherein the C2-C20 N-hydroxyalkylamine is triethanolamine.

4. The method of claim 1, wherein the amino acid is L-glutamine.

5. A method for promoting an increase in plant growth in soil comprising applying an acidifying composition to the soil, wherein the acidifying composition comprises water, two organic acids, a C2-C20 N-hydroxyalkylamine, an amino acid and a plant extract additive, wherein the two organic acid are in a molar ratio of about 1:10 to 10:1, wherein the acidifying composition is in an amount sufficient to provide about 0.25 to about 25 moles acid per acre of the soil per month and wherein the two organic acids comprise citric acid and glycolic acid.

6. The method of claim 5, wherein the plant extract additive is *yucca schidigera* extract.

7. The method of claim 5, wherein the C2-C20 N-hydroxyalkylamine is triethanolamine.

8. The method of claim 5, wherein the amino acid is L-glutamine.

9. A method for promoting an increase in a population of earthworms in soil comprising applying an acidifying composition to the soil, wherein the acidifying composition comprises water, two organic acids, a C2-C20 N-hydroxyalkylamine, an amino acid and a plant extract additive, wherein the two organic acid are in a molar ratio of about 1:10 to 10:1, wherein the acidifying composition is in an amount sufficient to provide about 0.25 to about 25 moles acid per acre of the soil per month, and wherein the plant extract additive is *yucca schidigera* extract.

10. The method of claim 9, wherein the C2-C20 N-hydroxyalkylamine is triethanolamine.

11. The method of claim 9, wherein the amino acid is L-glutamine.

* * * * *